United States Patent [19]
Zaitsu et al.

[11] Patent Number: 4,757,397
[45] Date of Patent: Jul. 12, 1988

[54] MINATURE TAPE LOADING DEVICE

[75] Inventors: Osamu Zaitsu, Neyagawa; Satoshi Kikuya, Hirakata, both of Japan

[73] Assignee: Matsushita Electric Industrial Co., Ltd., Osaka, Japan

[21] Appl. No.: 823,730

[22] Filed: Jan. 29, 1986

[30] Foreign Application Priority Data

Feb. 1, 1985 [JP] Japan .................. 60-18255
Feb. 5, 1985 [JP] Japan .................. 60-20344

[51] Int. Cl.$^4$ .......................... G11B 5/027
[52] U.S. Cl. ...................... 360/85; 360/95
[58] Field of Search .......... 360/95, 85, 94, 83-84, 360/105

[56] References Cited

U.S. PATENT DOCUMENTS

| | | | |
|---|---|---|---|
| 4,213,162 | 7/1980 | Lemelson | 360/85 |
| 4,275,424 | 6/1981 | Maxey | 360/85 |
| 4,467,376 | 8/1984 | Jaegar | 360/84 |
| 4,595,961 | 6/1986 | Kuwajima | 360/85 |

FOREIGN PATENT DOCUMENTS

| | | | |
|---|---|---|---|
| 0019060 | 6/1972 | Japan | 360/85 |
| 0066205 | 6/1978 | Japan | 360/85 |
| 0171070 | 9/1984 | Japan | . |

Primary Examiner—John H. Wolff
Assistant Examiner—David J. Severin
Attorney, Agent, or Firm—Stevens, Davis, Miller & Mosher

[57] ABSTRACT

A tape loading device having a tape loading mechanism including a guide drum and other associated parts, the mechanism being movable with respect to the tape driving device on which the tape cassette is mounted. The guide drum is movable into the tape cassette beyond the opening formed in the tape cassette, so that the tape loading mechanism including the guide drum is housed within the outside dimension of the tape cassette, thus attaining a ultra-miniaturized mechanism.

1 Claim, 50 Drawing Sheets

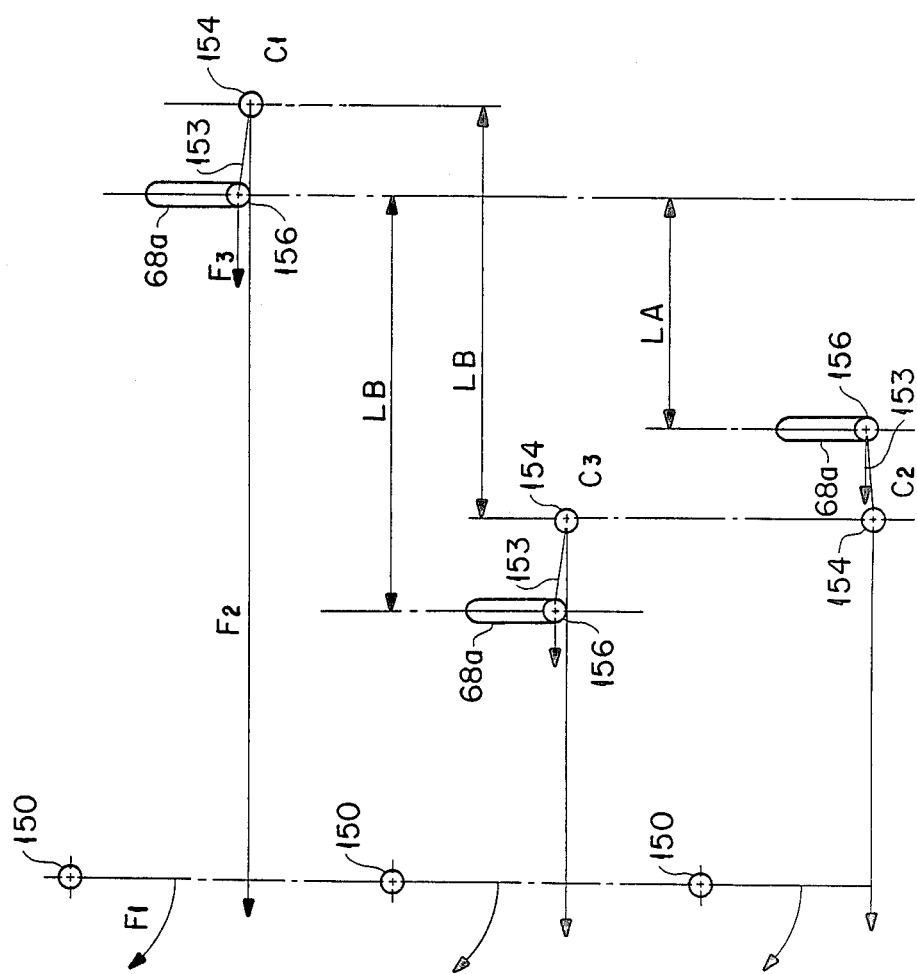

MINATURE TAPE LOADING DEVICE

BACKGROUND OF THE INVENTION

The present invention relates to a tape loading device for use in a recording/reproducing apparatus, typically VTRs, in which a tape as a recording medium is made to run in contact with a guide drum incorporating therein a transducer, over a predetermined wrap angle.

FIG. 44 shows, by way of example, a conventional tape loading device which is adapted for use, as disclosed in Japanese Patent Laid-Open No. 171070/1984, in a recording/reproducing apparatus of the type mentioned above.

A tape 103 is extracted from a supply reel 102 of a tape cassette 101 and runs past guide posts and an eraser head. Then, after making a turn on a guide drum 104 through a predetermined angle which is in this case 221°, the tape is taken up by a take-up reel 106 past a capstan 105. In this known tape loading device, the tape cassette 101 as a unit with a reel drive mechanism (not shown) is slidable with respect to the guide drum 104, so that the guide drum 104 finally comes into the opening 101a in the tape cassette 101, whereby a reduction is attained in the size of the device as a whole. This arrangement is generally referred to as "cassette overlap system".

Another proposal for the reduction in the size of the tape loading device is to reduce the size of the guide drum. A recording/reproducing apparatus incorporating such a guide drum of reduced size, referred to as "VHS video movie", is shown in FIG. 45. This video movie incorporates a guide drum 107 having a diameter which is as small as ⅔ that of the standard guide drum 110, by virtue of the use of four heads A, B, A', B' as shown in FIG. 46. FIG. 47 shows a tape pattern which illustrates the fact that both guide drums are completely interchangeable. As is well known to those skilled in the art, the wrap angle of the tape on the reduced-diameter guide drum 107 is about 3/2 that on the standard size guide drum 110. When this art is applied to the 8 mm video, the arrangement is as shown in FIG. 48 with the following specifications:

Standard-Size Guide Drum 104

Diameter 40 mm, 2 heads, 1800 rpm, wrap angle 221° (180° for video section, 30° for PCM audio section, 11° for other section)

Reduced Diameter Guide Drum 60

Diameter 26.7 mm, 4 heads, 2700 rpm, wrap angle 331.5°.

The smallest system amongst the systems proposed now is the one which simultaneously incorporates both the guide drum of the reduced size and the tape cassette overlap type arrangement which were mentioned before. An example of such smallest tape loading device is shown in FIG. 60. In this device, the guide drum 60 of the reduced diameter is disposed in the opening of the tape cassette 101 and the tape is wound on this guide drum through the angle of 331.5°. It would be practically impossible to obtain a tape loading device smaller in size than the device shown in FIG. 60, insofar as the device is required to handle a 8 mm tape cassette 101.

In spite of this fact, there is a natural demand for the device of this kind having much smaller size and weight, say small size and weight which well compares with those of a headphone stereo for audio cassettes. In fact, the final reduction of the size of headphone stereos to the audio cassette size was the primary factor for the rapid spread in use of the headphone stereos. This will apply also to 8 mm VTRs. Namely, considering that the 8 mm VTRs are often used outdoors, it will be necessary that the size and weight of the 8 mm VTRs be finally reduced to cassette size. In case of VTRs, however, the reduction in the size and weight is quite difficult due to the use of a complicated tape loading mechanism which occupies a large space.

SUMMARY OF THE INVENTION

Accordingly, a first object of the invention is to provide a tape loading device of a tape cassette size, thus meeting the demand explained hereinbefore.

A second object of the invention is to minimize the area occupied by the tape path, thereby allowing a reduction in the size of the device as a whole.

A third object of the invention is to enable recording, as well as reproduction, of signals in a later-mentioned short-playing recording tape by means of a mechanism of tape cassette size.

A further object of the invention is to provide a mechanism in which, when a predetermined tape path is formed by a movement of a guide drum with respect to a reel shaft, the tape path is maintained stably regardless of the precision of the position of the guide drum in the direction of movement thereof.

To these ends, according to an aspect of the invention, there is provided a tape loading device comprising a guide drum movable with respect to a reel shaft towards and away from the reel shaft, wherein the improvement comprises that the guide drum can take a first position at which it opposes the reel shaft across a tape stretched on the front side of the tape cassette, a second position within the tape cassette opening into which a tape extraction post is inserted beyond the position where the tape is stretched, and a third position at which the guide drum is received at least partially by the tape cassette opening so as to approach the reel shaft.

The above and other objects, features and advantages of the invention will become clear from the following description when the same is read in conjunction with the accompanying drawings.

FIG. 68(a)-(c) are schematic diagrams illustrating positions of the tape loading device according to the invention.

DESCRIPTION OF THE PREFERRED EMBODIMENTS

FIGS. 49 to 59 show an 8 mm tape cassette suitable for use in an embodiment of the invention.

Figure 49:
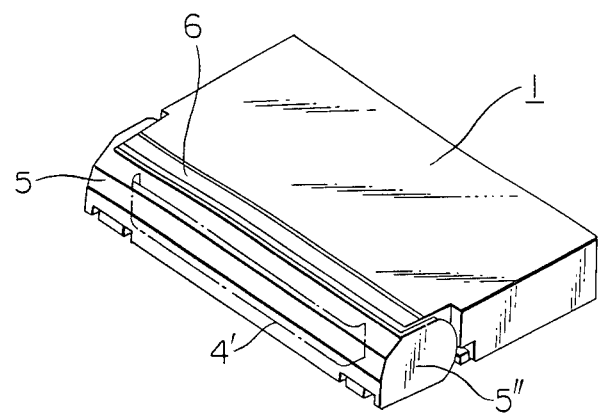
FIG. 49 is a perspective view of a standard tape cassette of an 8 mm VTR as viewed from the upper side thereof.
Figure 50:
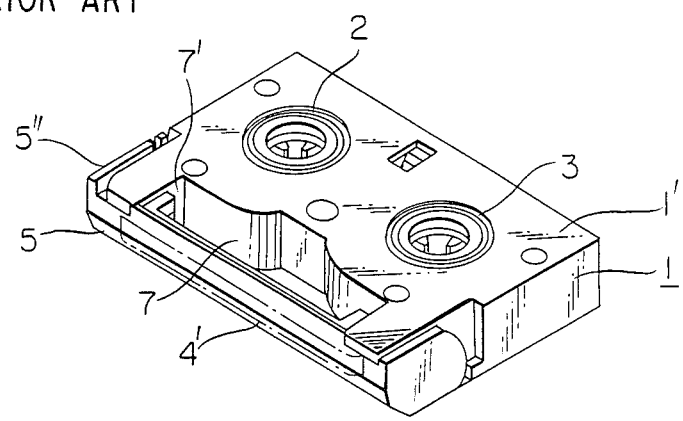
FIG. 50 is a perspective view of the standard tape cassette as viewed from the lower side thereof.
Figure 51:
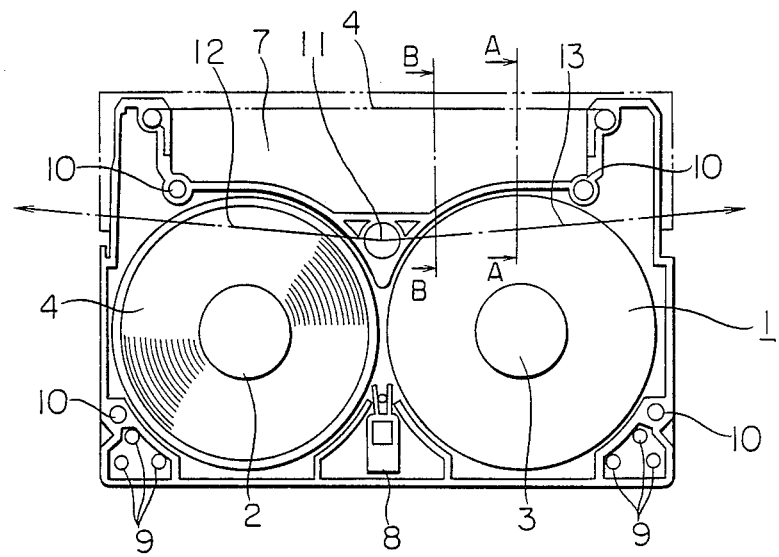
FIG. 51 is a plan view of a standard tape cassette.
Figure 52:
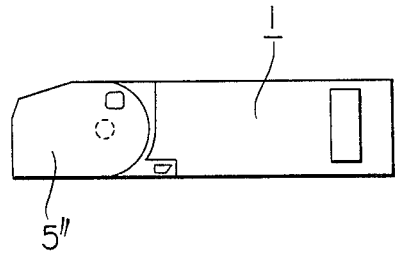
FIG. 52 is a side elevational view.

Referring first to FIG. 49 which is a perspective view as viewed from the upper side thereof, a tape cassette 1 incorporates a pair of reels 2 and 3 (see FIG. 51). When the tape cassette 1 is not used, the tape 4' wound on the reels 2, 3, is covered by rotatable front and rear covers 5 and 6. A reference numeral 7 appearing in FIG. 51 designates an opening through which a post or the like member is inserted for the purpose of extraction of the tape 4' stretched on the front side of the tape cassette 1. A reference numeral 8 denotes a reel lock for preventing slacking of the tape 4. The tape information such as the thickness, kind and the length of the tape 4 are confirmed through checking the state of an information window 9, i.e., whether this window is opened or closed. A reference numeral 10 denotes a locating hole for correctly locating the tape cassette 1 in the device, while a numeral 11 designates a sensor hole which receives a light-emitting element for providing information concerning the starting and terminating ends of the tape 4. The light-emitting element forms light paths in the direction of arrows 12 and 13. Needless to say, there is a light-receiving element which is disposed so as to oppose the light-emitting element.

Figure 53:
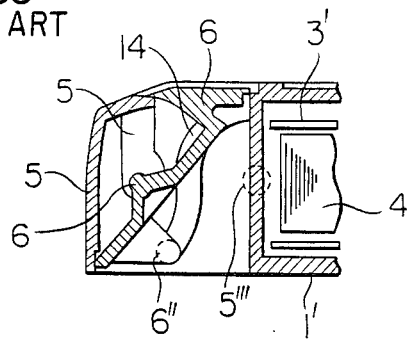
FIGS. 53 to 55 are sectional views of a cassette cover opening and closing mechanism.
Figure 54:
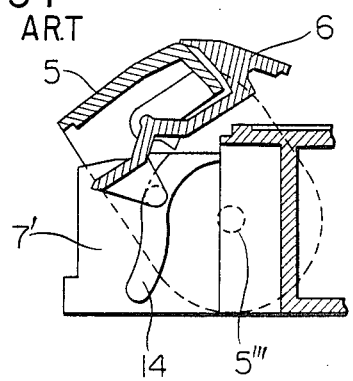
Figure 55:
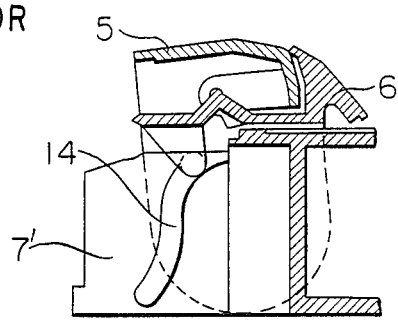

FIGS. 53 to 55 are sectional views showing the detail of the operation for opening and closing the front and rear covers 5 and 6. The front cover 5 is rotatably carried by front ends of both side walls of the cassette 1, for swinging movement about a shaft 5'''. A numeral 5' designates an arm for rotatably supporting the support shaft 6' of the rear cover 6. The rear cover 6 has a projection 6'' which engages with a guide groove 14 formed in the side wall 7' defining an opening 7 in the tape cassette 1. The cover mechanism having the described construction is urged into the state shown in FIG. 53 by means of a resilient member, but can swing between the position shown in FIG. 54 and the position shown in FIG. 55 by an external force. The guide provided by the guide groove 14 for the rear cover 6 permits a smooth opening and closing of the rear cover 6 without contacting the tape 4'.

Figure 56:
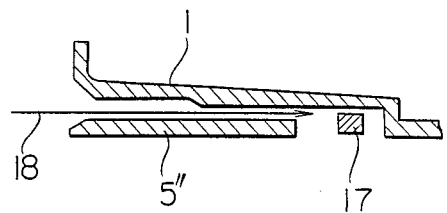
FIG. 56 is a partial sectional view of a cassette lock portion.
Figure 57:
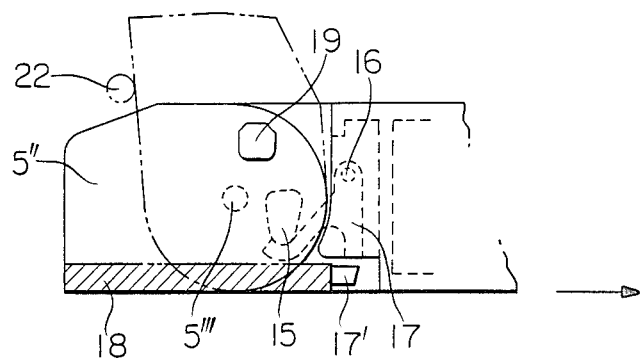
FIG. 57 is a side elevational view of a cassette lock portion.
Figure 58:
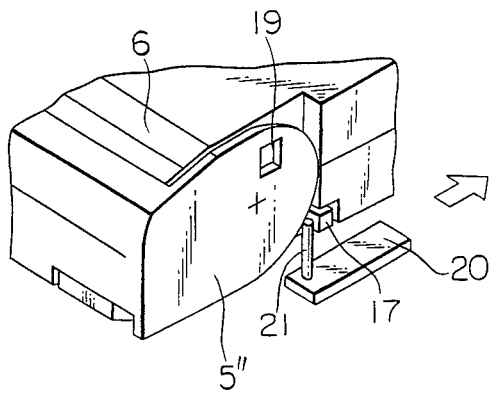
FIG. 58 is an illustration of an example of the unlocking of the cassette cover.
Figure 59:
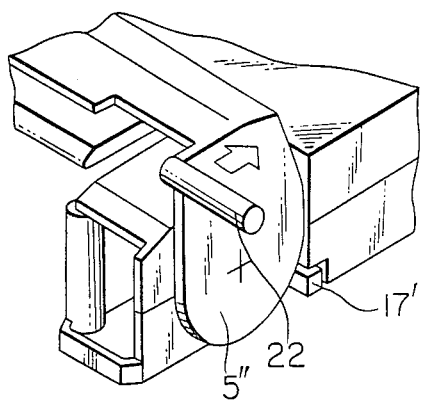
FIG. 59 is a perspective view of a cover opening/closing mechanism.
Figure 60:
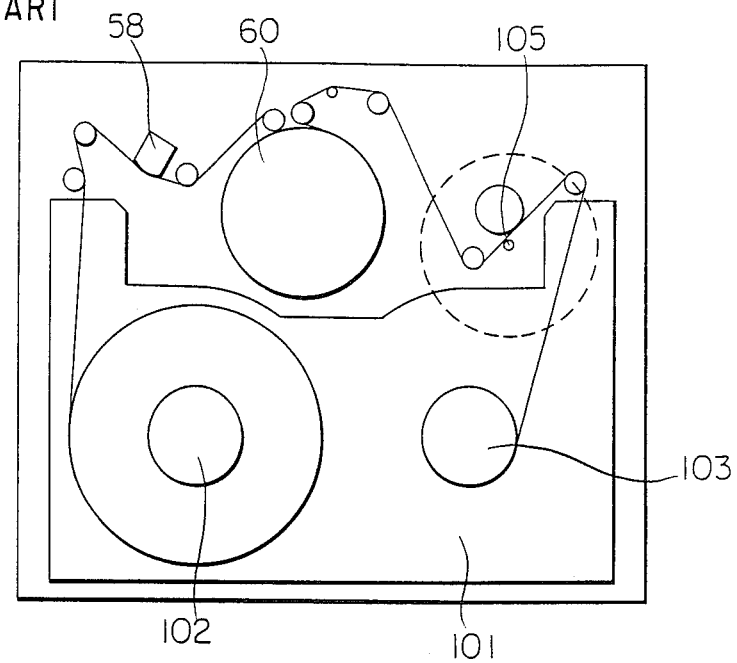
FIG. 60 is a plan view of another embodiment of the tape loading device of the invention incorporated in a 8 mm VTR which employs a guide drum of a reduced size.

FIGS. 56 and 57 show the portion of the device near the left side surface 5'' of the front cover 5 shown in FIG. 49, particularly the detail of the front cover 5 and the rear cover 6. The front cover 5 is rotatable about the support shaft 5''' to a position shown by two-dot-and-dash line. However, the projection 15 which is formed on the left side surface 5'' of the front cover 5 near the support shaft 5''' engages with one end of the cover lock claw 17 rotatable about a pivot point 16, so that the rotation of the front cover 5 is prevented. When the external actuating slide pin 21 moves along the hatched area shown in FIG. 57 and along the arrow illustrated in FIG. 56, the projection engages with an unlocking member 17' of a cover lock claw 17 which is being urged by a resilient member in the clockwise direction. In consequence, the front cover 5 is unlocked so as to be opened and closed freely. A rectangular hole 19 formed in the left side surface 5'' of the front cover 5 forms a light path 12 for the light from the light-emitting element when the front cover 5 is opened. The light path, however, is usually interrupted by the left side wall 5'' of the front cover 5. Needless to say, the tape cassette has a substantially symmetrical construction so that the left and right sides of the tape cassette perform the same functions including the shut-off and opening of the light path, although the cover lock mechanism is provided only on one side thereof. FIGS. 58 and 59 are perspective views showing an example of the operation for opening and closing the cover. Referring to FIG. 58, an unlocking member 17' of the cover lock claw 17 is adapted to be rotated counter-clockwise by the slide plate 20 and the slide pin 21, thereby to unlock the cover.

On the other hand, FIG. 59 shows that the front and rear covers 5 and 6 are opened by means of a cover opening pin 22 provided on the body of the device.

Figure 2:
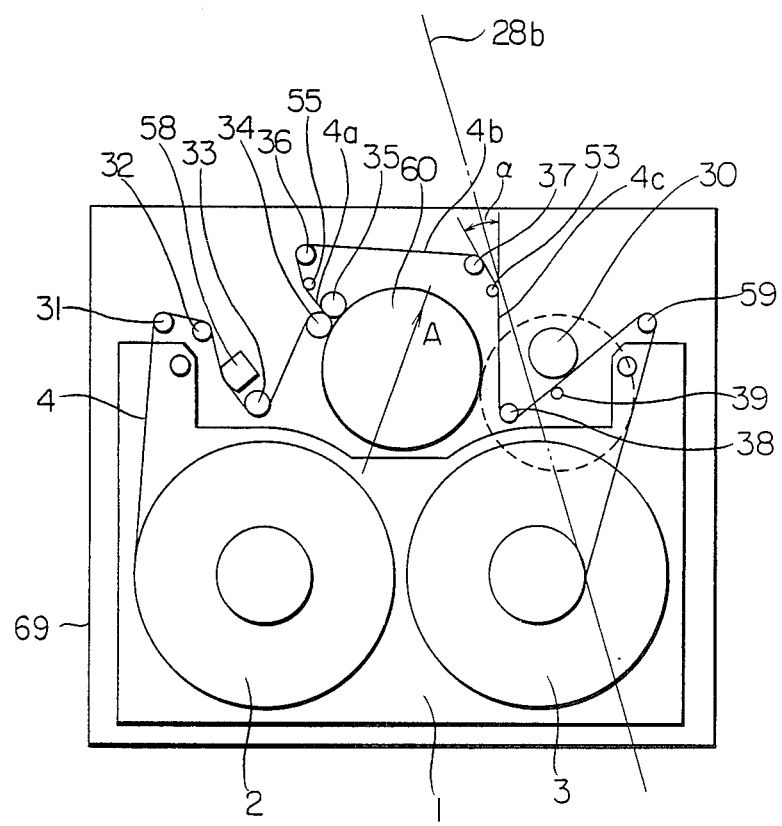
FIG. 2 is an illustration of a tape path as obtained when a standard tape cassette is used.
Figure 3:
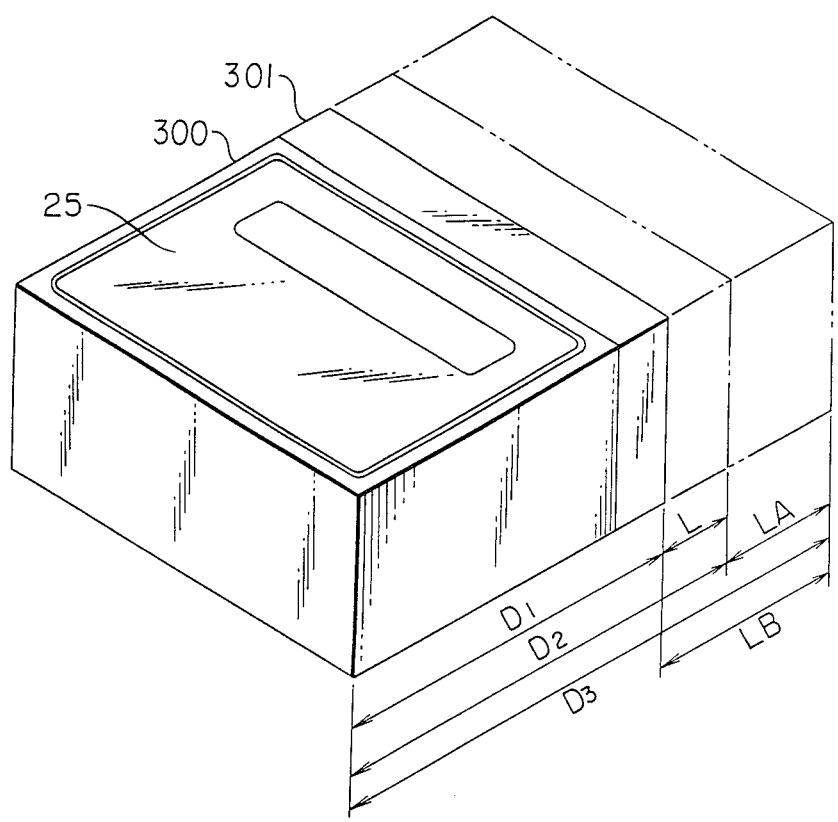
FIG. 3 is a perspective view of a housing.

The guide drum 60 can take one of three positions C1, C2 and C3, with respect to the tape cassette 1. More specifically, before the loading, the guide drum 60 takes a position C1. In this state, the opening 7 of the tape cassette 1 accommodates a plurality of tape extraction posts. When the tape loading is completed, the guide drum 60 takes a position C2, where the tape is wound on the guide drum 60 through a predetermined angle, thereby preparing for the reproduction. When the tape cassette 1 is not loaded on the device, the guide drum takes the position C3, in which the guide drum is partially projects into the space to be occupied by the tape cassette 1, through and beyond the opening 7 as viewed in a plane view. FIG. 2 shows the guide drum 60 in the position C2, with the tape wound through a predetermined angle thereon. The tape 4 leads to the guide drum 60 past a plurality of rotary posts: namely, an S1 post 31, S2 post 33, S3 post 34, and a tension post 32, as well as an erase head 58.

Figure 43:
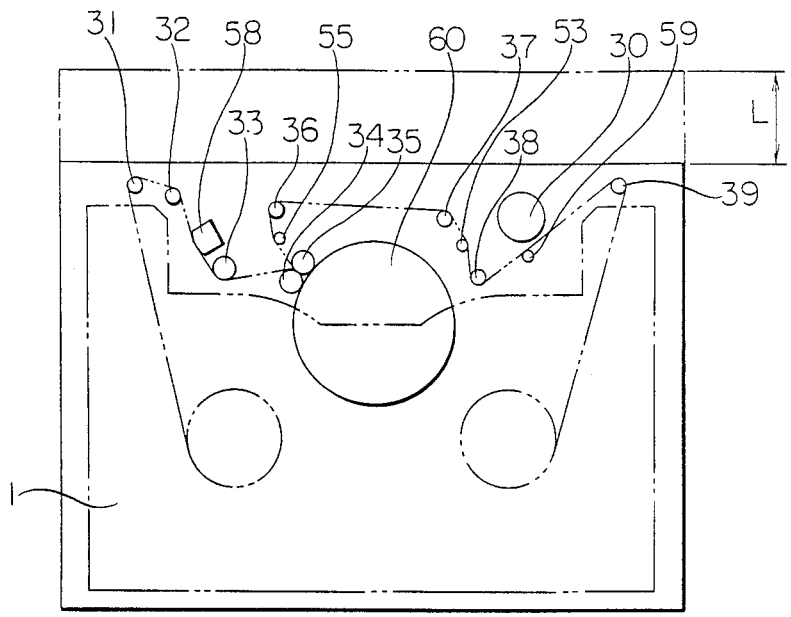
FIG. 43 is a plan view of an embodiment of the tape loading device of the invention in the state before the mounting of a tape cassette.
Figure 44:
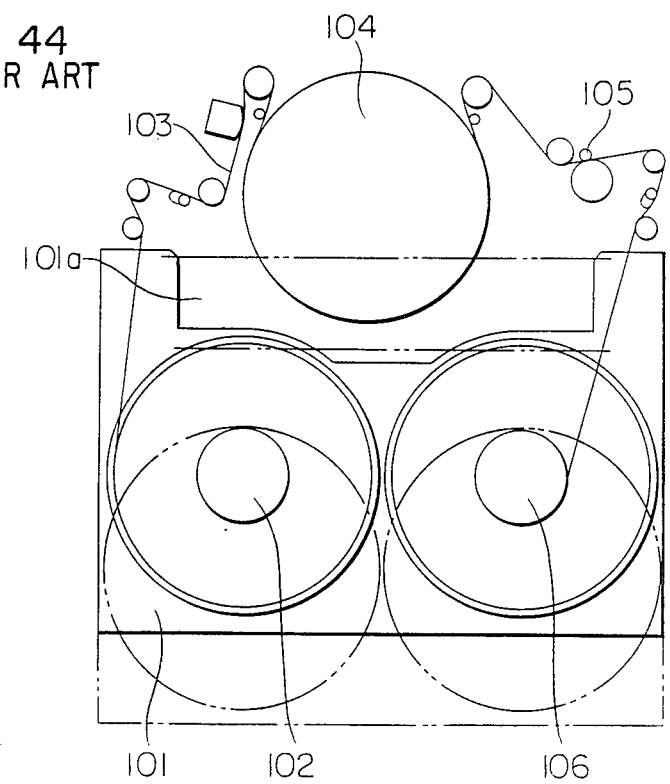
FIG. 44 is a plan view of an example of a known guide drum/tape cassette overlap system.
Figure 45:
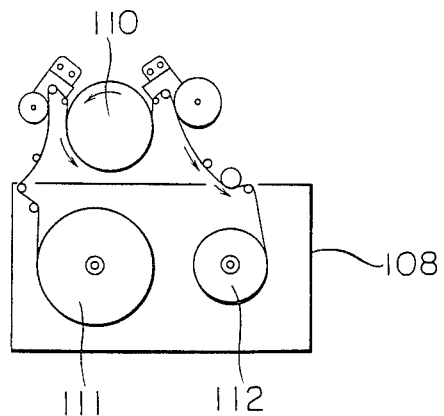
FIG. 45 is an illustration of a VHS standard tape path.
Figure 46:
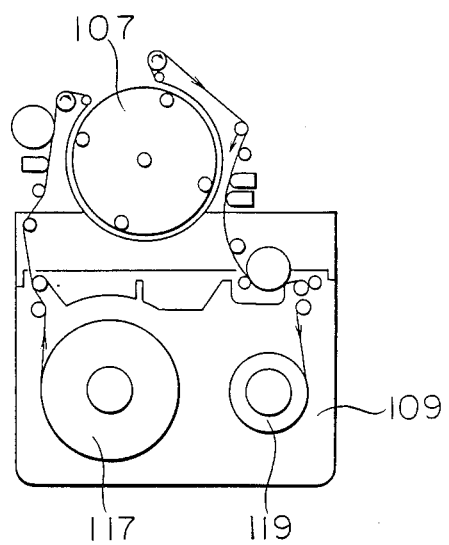
FIG. 46 is an illustration of a tape path in a 4-head VHS with a guide drum of a reduced size.
Figure 47:
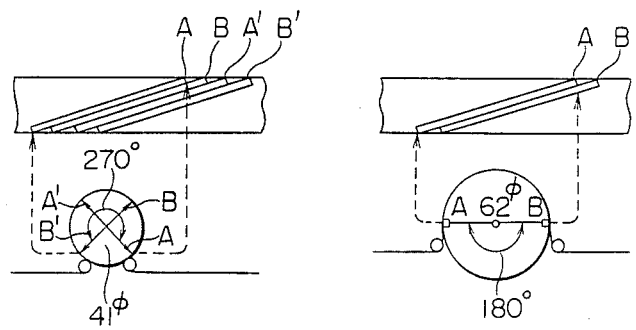
FIG. 47 is an illustration of the tape pattern as obtained in a VHS with a guide drum of reduced size and a standard guide drum.
Figure 48:
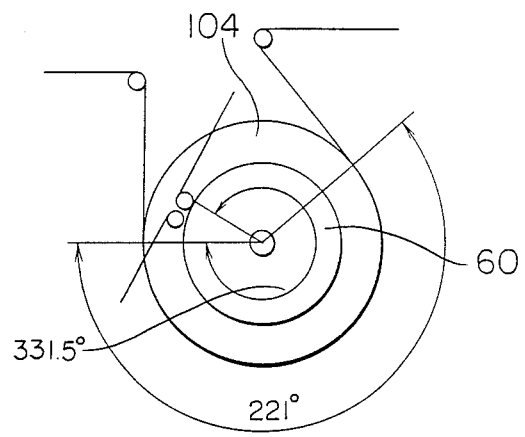
FIG. 48 is an illustration of a standard guide drum and a guide drum of a reduced size in an 8 mm VTR.

The guide drum 60 is inclined in the direction A by a predetermined lead angle. The direction A is parallel to the tape stretched between the S3 post 34 and the guide drum 60, so that all the tape guide members between the supply reel 32 and the guide drum 60 including the supply reel 32 are perpendicular to the bottom surface of the cassette. The tape 4 which is wound on the guide drum 60 over an angle 331.5° leads to the inclined guide post 53 past the rotary posts such as the T1 post 35, T2 post 36, and a T3 post 37, as well as a stationary post 55. Unlike other rotary posts, the stationary post 55 holds the tape in a helically wound form, so that the condition of twisting of the tape is changed across this stationary post 55. That is, the condition of twisting differs between the tape portion 4a leading from the guide drum 60 to the stationary post 55 past the T1 post 35 and the tape portion 4b leading from the stationary post 55 to the inclined guide post 53 past the T2 post 36 and the T3 post 37. A numeral 53 designates an inclined guide post for eliminating the twist of the tape 4b in accordance with the twisting condition. The tape 4c coming from the inclined guide post 53 is untwisted and runs in the same plane as the tape in the cassette. The rotary posts and other tape retaining and guiding members downstream from the inclined guide post 53, namely, the T4 post 38, T5 post 39, capstan 59 and the pinch roller 30, are arranged substantially perpendicularly to the bottom surface of the cassette. FIG. 43 shows the arrangement of the major parts in the tape loading device with no tape cassette 1 mounted thereon. The guide drum 60, S3 post 34, T1 post 35, T2 post 36, T3 post 37, stationary post 55 and the tapered guide post 53 have been moved from the positions shown in FIG. 2 by a distance corresponding to "L" shown in FIG. 1, i.e. from the position C2 to the position C3. Other posts 31, 32, 33, 38, 39, erase head 58, pinch roller 30 and the capstan 59 are in the same position as those in FIG. 2. With this arrangement, the size of the holder body 69 of the device can be reduced by an amount "L" of movement of the tape loading device around the guide drum 60. It is, therefore, possible to reduce the size of the mechanism almost to that of the tape cassette 1. Namely, according to the invention, the movement of the guide drum 60 is achieved not by a mere movement of the mechanism but by the movement of the housing as a whole, thus fulfilling the object of the invention: namely, the reduction of the size of the VTR to that of the tape cassette 1.

The housing exhibits the greatest size D3 in the period between the opening of the cassette holder 25 for mounting the tape cassette 1 on the VTR till the tape loading with the tape cassette 1 mounted on the VTR. Thereafter, the tape loading is conducted so that the VTR is ready for the recording as shown in FIG. 2 with the housing size reduced to D2. When the cassette holder 25 alone is mounted on the body of the VTR after demounting of the tape cassette 1, the housing shows the minimum size D1. That is, the user can carry and transport the VTR in the minimal cassette size.

Figure 7:
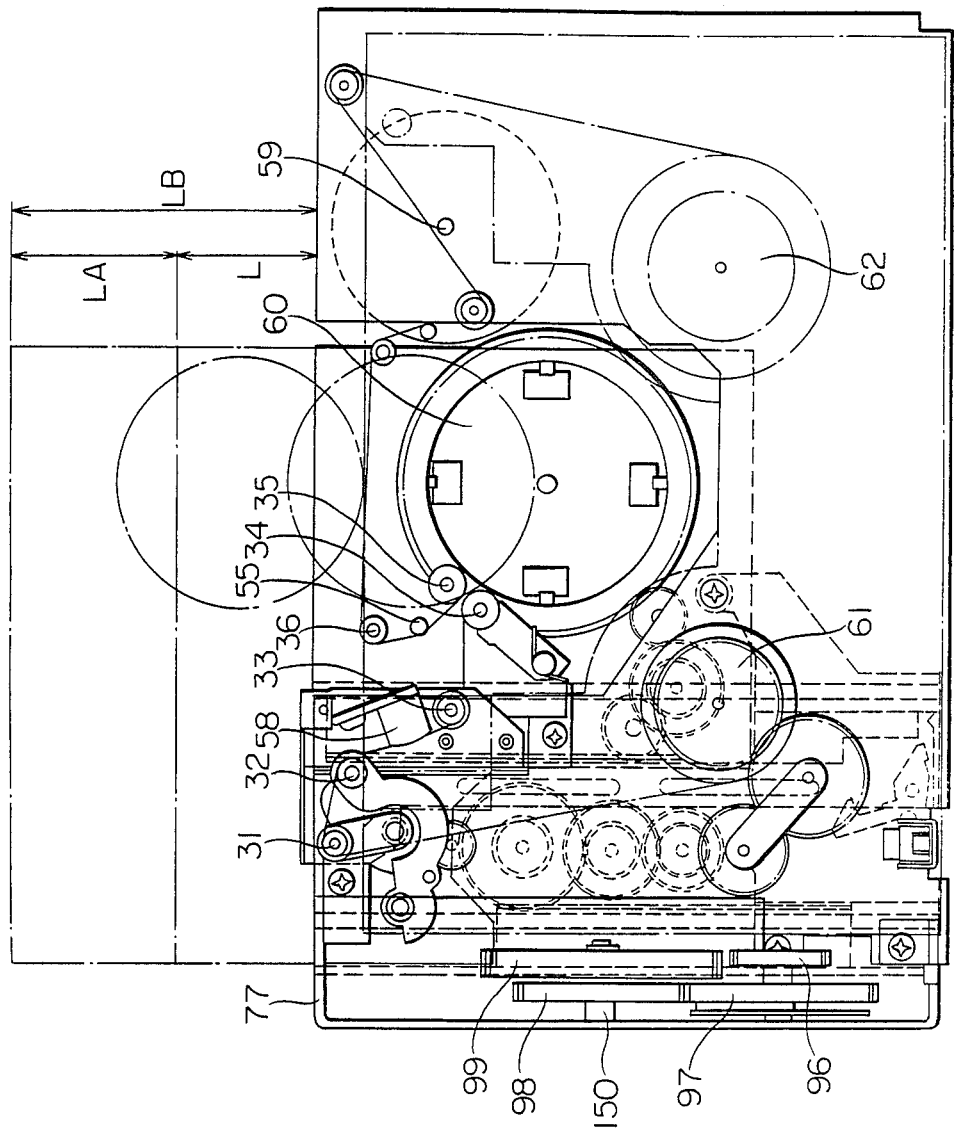
FIG. 7 is a plan view of a practical embodiment of the invention.
Figure 8:
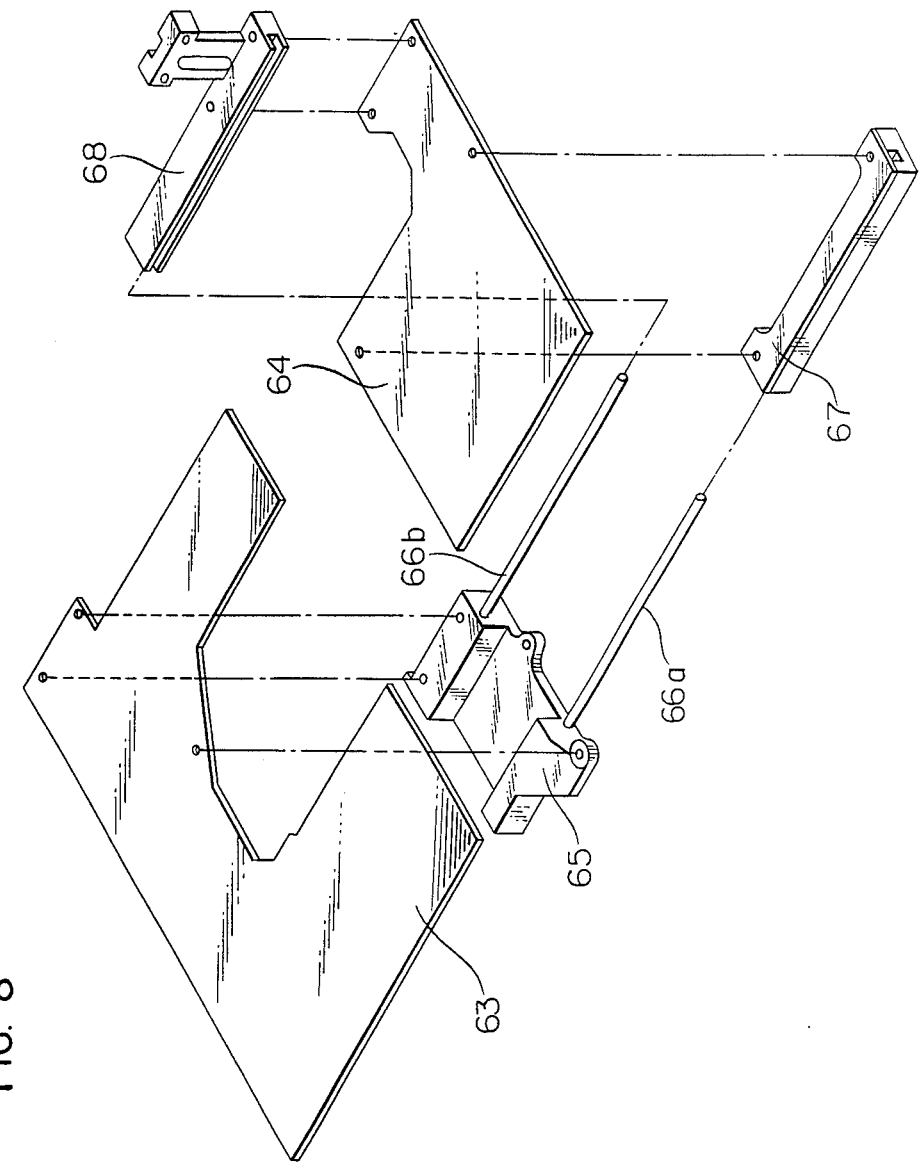
FIG. 8 is a perspective view of a chassis structure.
Figure 9:
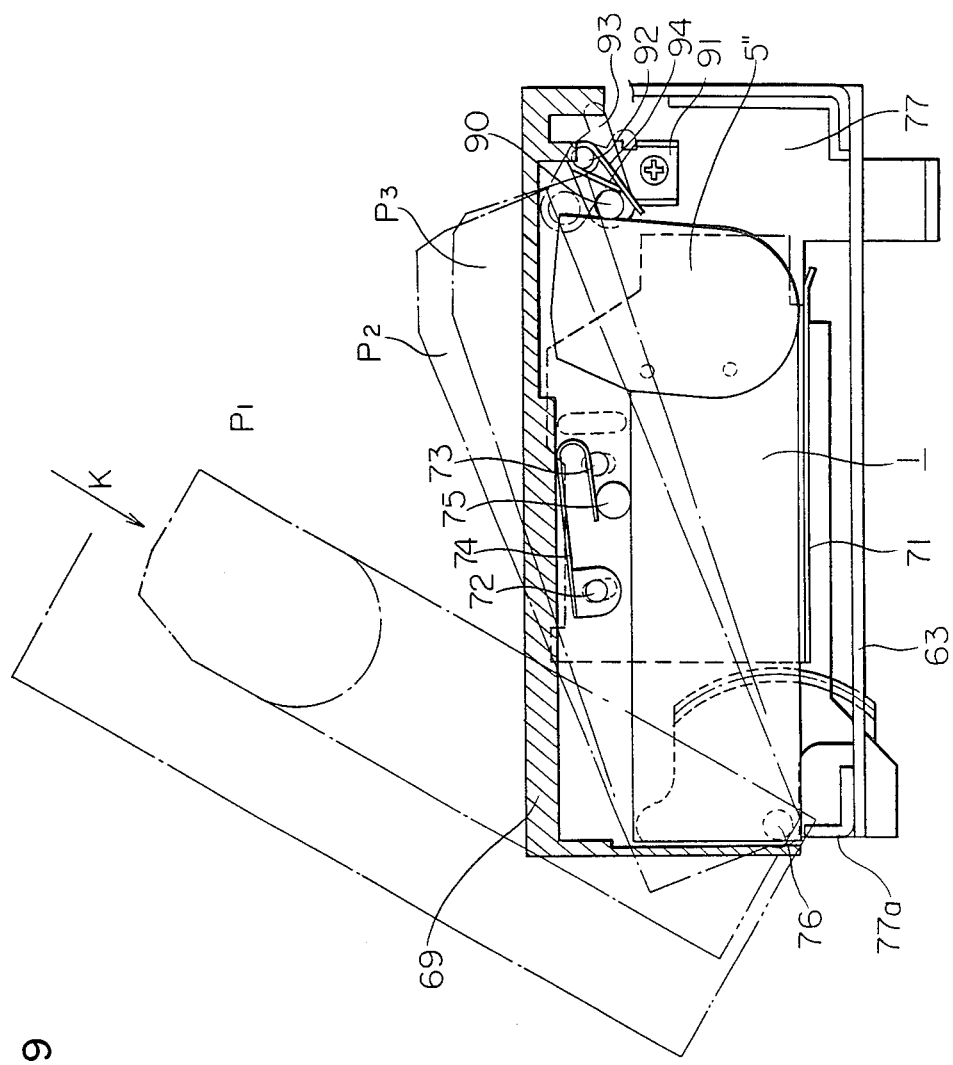
FIG. 9 is a side elevational view of a cassette holder.

The detail of the mechanism of the tape loading device of the invention will be explained hereinunder with reference to FIG. 7 and other Figures. FIG. 7 is a plan view of the whole device when the housing has the size D1, i.e., with no cassette 1 therein. The device has a reel drive block including a supply reel base 61 and a take-up reel base 62, and a tape loading block including the guide drum 60 and other associated parts. As shown in FIG. 8, the chassis has a construction composed of a pair of panels. A reference numeral 63 designates a driving chassis of the reel driving block mentioned before, while 64 denotes a loading chassis on which the guide drum 60 and other associated parts are mounted, the loading chassis being slidably held by guide shafts 66a, 66b on the shaft housing 65 fixed to the underside of the driving chassis 63 and by a chassis guide A 67 and a chassis guide B 68. The construction of a cassette holder incorporated in the device of the invention will be explained hereinunder with reference to FIG. 9. The path of movement of the cassette during the mounting is shown by an imaginary line in FIG. 9. A tape cassette 1 is inserted into the cassette holder 25 in the direction of the arrow K. It will be understood that the direction of insertion of the cassette is reverse to that in the conventional device. This owes to the fact that the size of the device is as small as that of the tape cassette and the fact that a higher rigidity is obtainable by virtue of a simple pivoted rotary-type construction.

Figure 10:
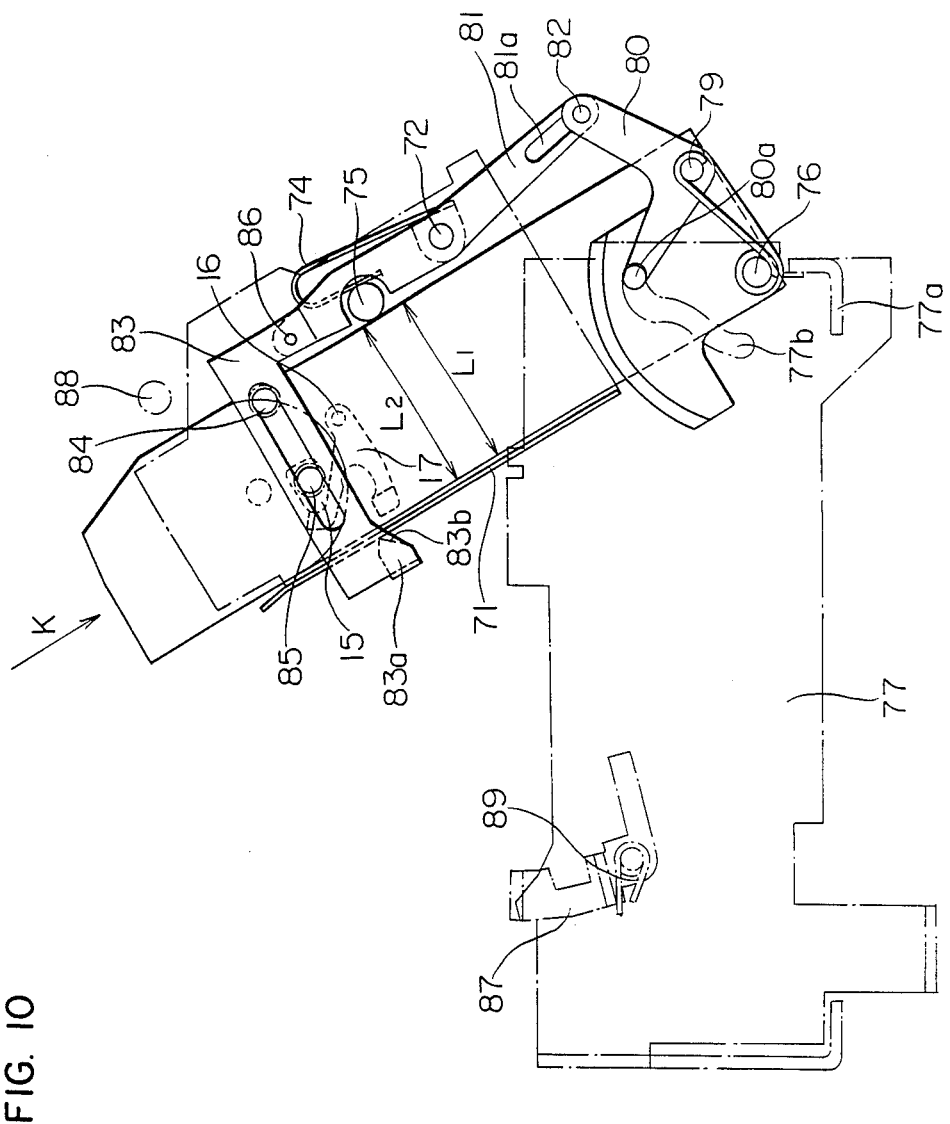
FIG. 10 is a side elevational view of the cassette holder in cassette-up state.
Figure 11:
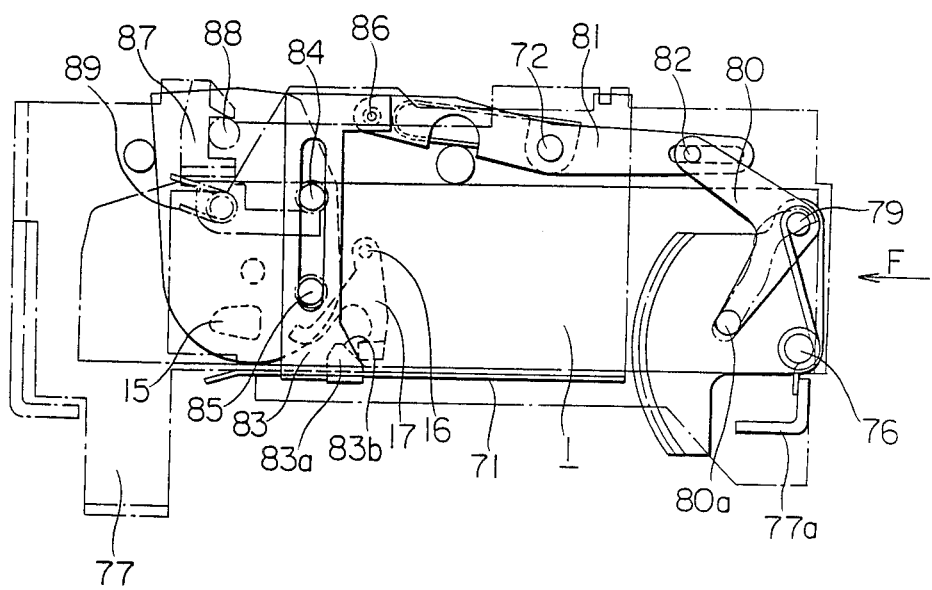
FIG. 11 is a side elevational view of the cassette holder in cassette-down state.
Figure 12:
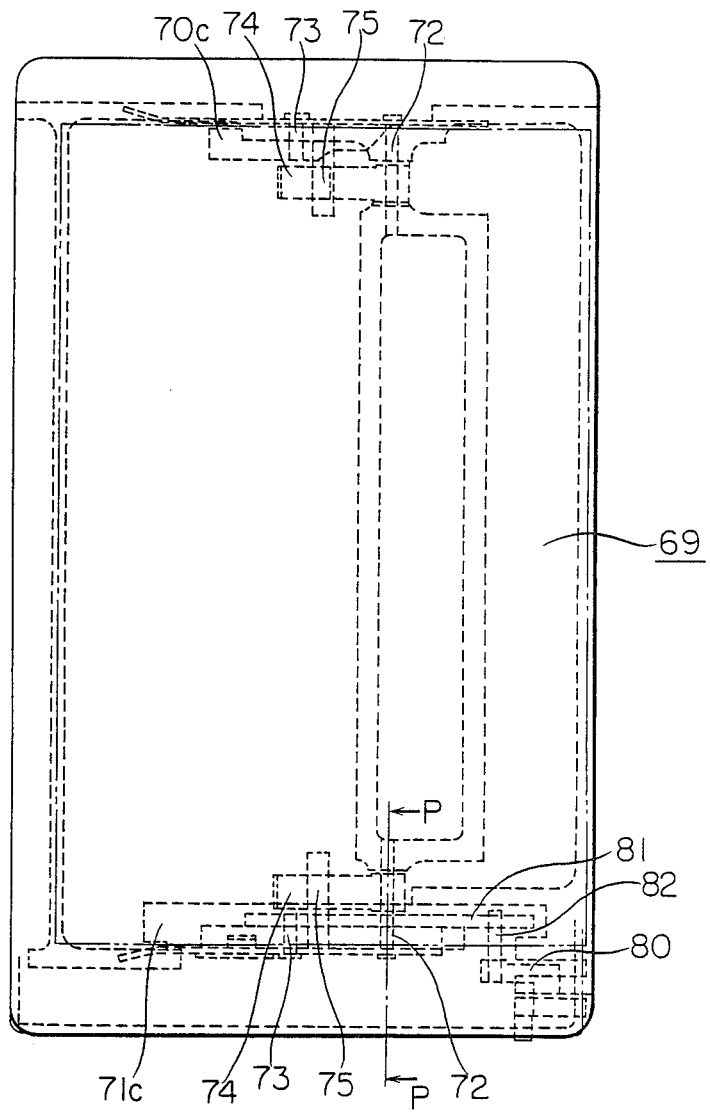
FIG. 12 is a plan view of the cassette holder.
Figure 13:
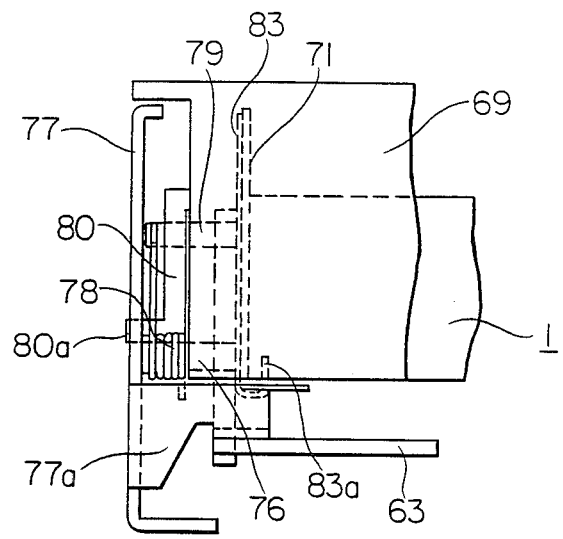
FIG. 13 is a partial front elevational view of the cassette holder.
Figure 15:
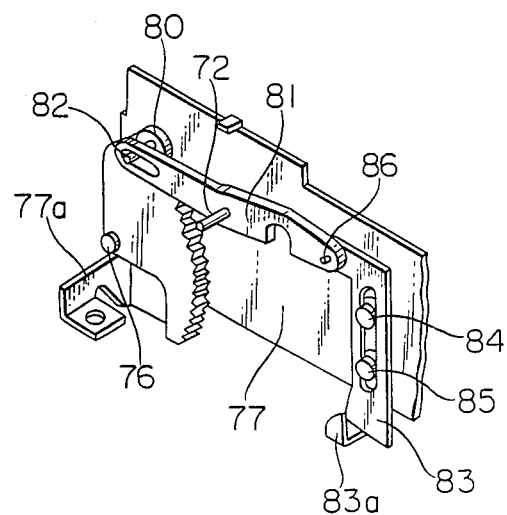
FIG. 15 is a perspective view of a cassette holder cover unlocking mechanism.

FIGS. 10 and 11 are side elevational views of the cassette holder in the cassette-up state and cassette-down state, respectively, while FIG. 12 shows in plan the cassette holder in the cassette-down state. Referring to FIG. 12, the holder body 69 has a right side wall 70 and a left side wall 71. The side walls 70 and 71 have elongated guide holes 70a, 70b, 71a, 71b each of which receives respective one of four guide pins 72, 73 supported by the holder body, so that the side walls 70 and 71 are held by the holder body for slight vertical sliding movement. The guide pin 72 serves as a support for a cassette pressing spring 74. The cassette pressing spring 74 has one end contacting a cassette pressing pin 75 which is integral with the right and left side walls 70, 71, and the other end contacting the holder 69. Thus, the right side wall 70 and the left side wall 71 are urged away from the holder body 69. A reference numeral 76 designates a holder pivot which is fixed to each of a right base plate (not shown) and a left base plate 77 which in turn are fixed to both sides of the driving chassis 63, so as to rotatably support the holder body 69 in engagement with holes in both side walls of the holder body 69. A holder spring 78 is provided on a holder support point 76 on the left side wall 77. The holder spring 78 has one end which is fixed to the stationary portion 77a of the left side wall 77 and the other end 79 which engages with a stationary portion 77a on the left side wall 77, thus urging the holder body 69 in the clockwise direction as viewed in FIG. 10. A cam lever 80 rotatably carried by the cam lever support pin 79 has a substantially L-shaped form as shown in FIG. 11 and FIG. 13 which is a view as viewed in the direction of an arrow F in FIG. 11. More specifically, the cam lever 80 has projection 80a which engages with a cam groove 77b formed in the left base plate 77 and a cam pin 82 which engages with an elongated hole 81a which is formed in a relay lever 81 shown in FIG. 12. The relay lever 81 is rotatably supported by a guide pin 72. The relay lever 81 has one end which engages, through an unlocking lever pin 86, with a cover unlocking lever 83 which is slidably carried by the left surface 71 by means of pins A 84 and B 85. FIG. 15 shows the relationship between the cover unlocking lever 83 and the relay lever 81. The cover unlocking lever 83 is provided on the underside thereof with a U-shaped projection 83a. A reference numeral 87 designates a lock claw which has a claw portion 87a engageable with a lock pin 88 on the holder body 69 in such a manner as to allow the extraction of the cassette holder and the tape cassette 1. In the cassette-up state shown in FIG. 10, the lock claw 87 is held in a position rotated counter-clockwise overcoming the force of the lock spring 89, whereas, in the cassette down state shown in FIG. 11, it is biased clockwise by the lock spring 89. The operation of the lock claw 87, with its claw portion 87a engaging with the lock pin 88, will be explained later in conjunction with the description of the tape loading operation.

Figure 14:
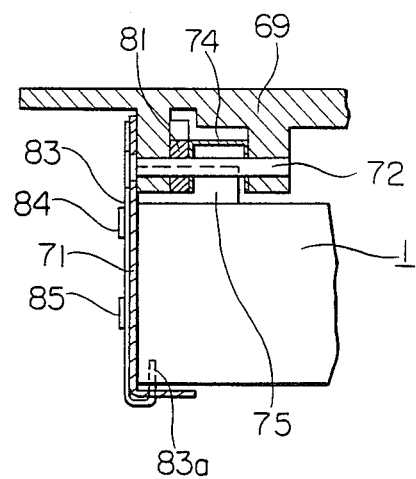
FIG. 14 is a sectional view taken along the line P—P of FIG. 12.

The operation of the cassette holder having the described construction is as follows. The tape cassette 1 is inserted in the direction of an arrow K. In this state, the right side wall 70 and the left side wall 71 are urged downwardly by the force of the cassette pressing spring within the region allowed by the elongated guide holes 70a, 70b. In this state, the distance L1 between the lower end of the cassette pressing pin 75 and the cassette support portion 70c, 71c of the right and left side walls 70, 71 is slightly greater than the thickness L2 of the tape cassette 1, so that the cassette pressing spring 74 is not loaded even though the tape cassette 1 is inserted. When the holder body 69 is pressed so as to cause a rotation of the cassette holder about the support point 76 against the force of the holder spring 78, the cam lever 80 is rotated counter-clockwise as viewed in FIG. 10 about the cam lever support pin 79, while being guided by the cam groove 77b in the left base plate 77. As a result, the relay lever 81 is rotated clockwise about the guide pin 72, so that the cover unlock lever 83 is slided upwardly while being guided by the pins A 84 and B 85. The projection 83a of the cover unlock lever 83 is below the level of the bottom of the tape cassette 1 in the state shown in FIG. 10. However, as a result of the upward sliding of the cover unlock lever 83, the projection 83a of the cover unlock lever 83 comes to be received partially by the portion of the standard cassette 1 in a manner shown in FIG. 14 which is a sectional view taken along the line P—P in FIG. 12. The area where the projection 83a is received involves the cover unlock mechanism, so that the projection 83d is brought into contact with one end of the cover unlock claw 17. As a result, the end of the cover lock claw 17 slides on a slope 83b on the projection 83a, so that the cover lock claw 17 is rotated counter-clockwise about the claw support point 16. Consequently, the projection 15 which has been engaged by a portion of the cover lock claw 17 is disengaged from the same, thereby allowing the front cover 5 to be opened. This series of operation is completed while the cassette 1 moves from the position P1 to the position P2 as viewed in FIG. 9. When the tape cassette 1 is in the position P2, a cover opening pin 90 is made in contact with a portion of the front cover 5 of the tape cassette 1. The cover opening pin 90 is fixed to an opener 93 which is adapted to rotate about an opener support pin 92 provided on the stopper plate 91. The opener 93 is urged clockwise by an opener reset spring 94 and is stopped at the position of the imaginary line in FIG. 9 as it is contacted by a portion of the stopper plate 91. Therefore, when the tape cassette 1 is moved from the position P2 to the position P3, the opener 93 is rotated counter-clockwise such as to contact at its one end with the stopper plate 91, because the force of the opener reset spring 94 is smaller than the force of the front cover spring (not shown) which acts to keep the front cover 5 in the closed state. A further rotation of the cassette holder causes the front cover 5 to open as indicated by a full line, so that the tape 4 becomes extractable. In this state, the lock pin 88 engages with the lock claw 87, so that the tape mounting operation is completed. In this state, the tape cassette 1 is supported at its bottom by a plurality of cassette locating pins (not shown) provided on the driving chassis 63 so as to be located both in the lateral and heightwise directions. Since the lock pin 88 and the lock claw 87 locate the cassette holder at a position which is further rotated from the position where the cassette 1 is contacted by the cassette locating pin, it is possible to downwardly bias the cassette 1 by the cassette pressing spring 74 through the cassette pressing pin 75, thereby firmly locating the tape cassette 1. In this embodiment, the cover opening pin 90 is rotatable so as to make it possible to utilize the operation of the opener 93 for the purpose of detection of the presence or absence of the cassette holder. Namely, the opener 93 which does not rotate from the position of the imaginary line permits the detection of the cassette.

Figure 16:
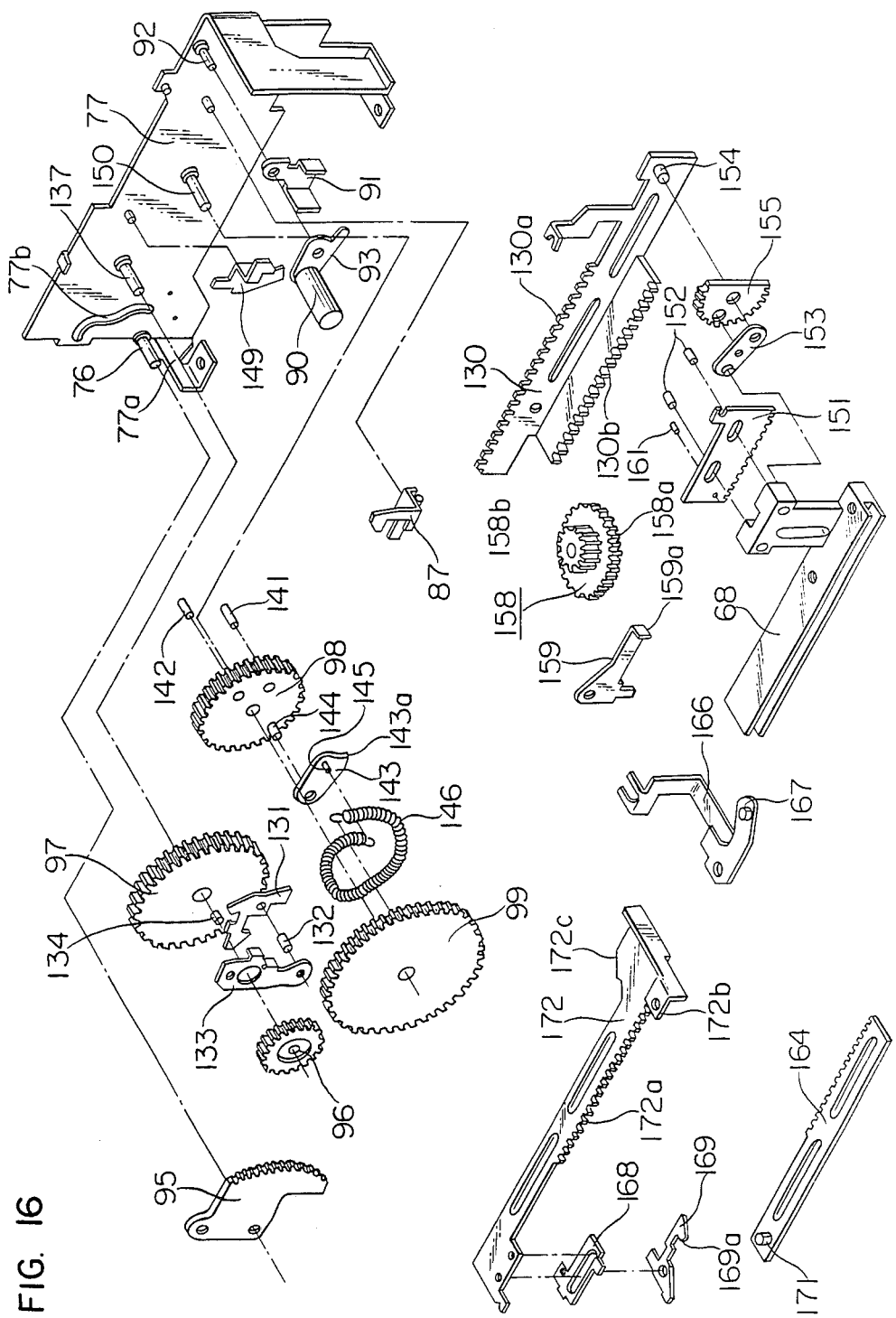
FIG. 16 is an exploded perspective view of a major part of a tape loading drive mechanism.
Figure 17:
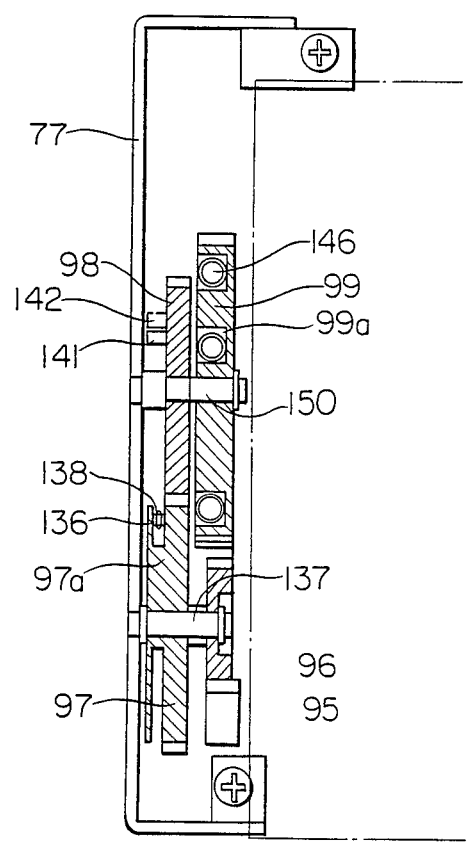
FIG. 17 is an illustration as viewed in the direction of arrows K—K in FIG. 18.
Figure 18:
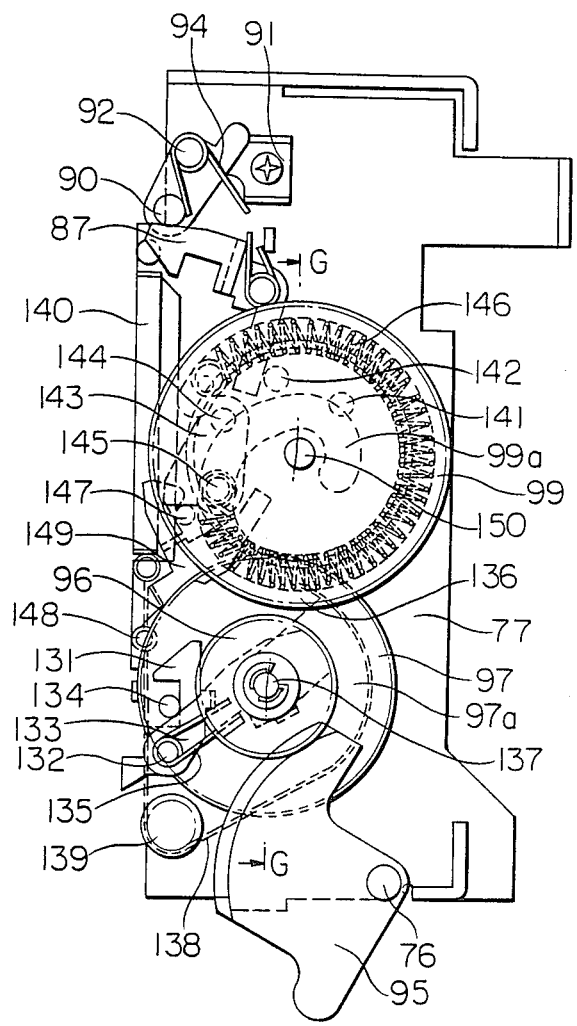
FIG. 18 is a side elevational view of the tape loading drive mechanism in the cassette-up state.
Figure 19:
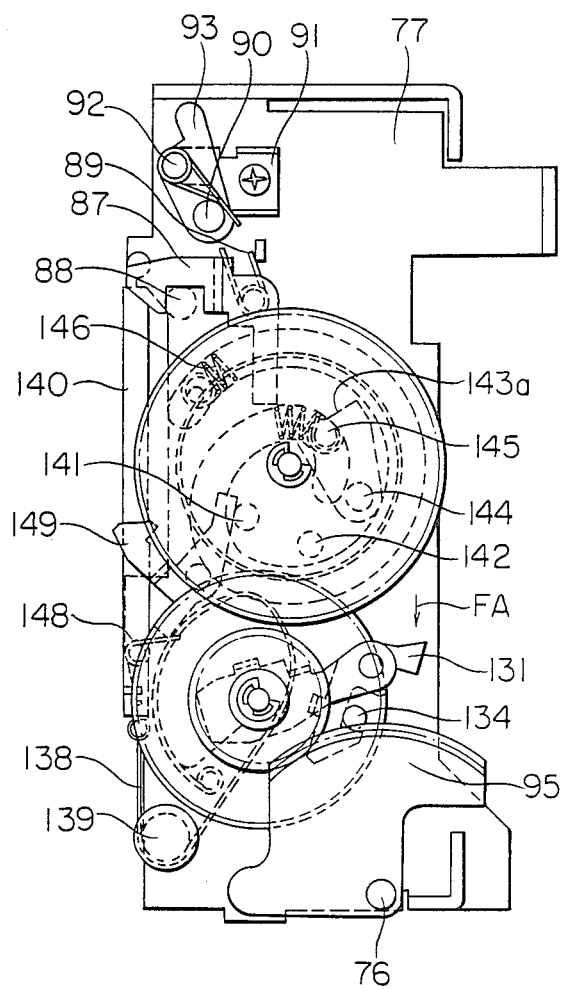
FIG. 19 is a side elevational view of a tape loading drive mechanism in the cassette-down state.

A description will be made hereinunder so as to the tape loading drive mechanism with reference to FIG. 16 and other Figures. A reference numeral 95 denotes a holder gear centered at the holder support point 76 shown in FIG. 10 and rotatable as a unit with the holder body 69. As shown in FIG. 17, the holder gear 95 engages with the main gear 96 so as to transmit the power further to an unload gear A 97, unload gear B 98 and the load gear 99. The load gear 99 is adapted to drive the main slide plate 130 on the loading chassis 64, thereby to effect the tape loading operation. The main gear 96 is integrally provided with a gear lock plate 133 engaged with a gear lock claw 131 which is rotatable about a lock claw shaft 132. The main gear 96 is carried by a main gear shaft 137. The gear lock claw 131 is urged by a gear spring 135 in such a direction as to engage with the gear lock pin 134 provided on the unload gear A 97. The unload gear A 97 is radially notched so as to provide a substantially sector-shaped drum portion 97a as shown in FIG. 18. An unload wire 138 which is retained at its one end by the wire hook pin 136 is wound round the drum portion 97a. The unload wire 138 is extended past the wire guide pin 139 so as to be retained by the unload spring 140 which is fixed at its one end to the left base plate 77. In consequence, the unload gear A 97 is biased in the clockwise direction. The unload gear B 98 is provided with a load gear pin 141 which projects towards the left base plate 77, a holder unlock pin 142 and a plate pin 144 which rotatably supports the load spring plate 143. The load gear 99 which is coaxial with the unload gear shaft 150 about which the unload gear B 98 rotates has a substantially spiral groove 99a on its side adjacent the unload gear B 98. The groove 99a receives a load spring 146 having one end fixed to the load gear 99 and the other end retained by a spring retainer pin 145 on the load spring plate 143. The load gear 99 is provided with a load gear lock pin 147 which projects towards the unload gear B 98 so as to engage with the retaining portion 143a of the load spring plate 143 thereby holding the load spring 146 in a state stretched by a predetermined amount. The load gear lock pin 147 engages with a load gear lock plate 149 which is rotatably supported by the left base plate 77 and biased clockwise by the load gear lock spring 148. In consequence, the load gear 99 is prevented from rotating clockwise. FIG. 18 shows the cassette holder in the cassette-up state, coinciding with the state of the cassette holder shown in FIG. 10. On the other hand, FIG. 19 illustrates the cassette holder in the cassette-down state, coinciding with the state of the cassette holder shown in FIG. 11.

Figure 20:
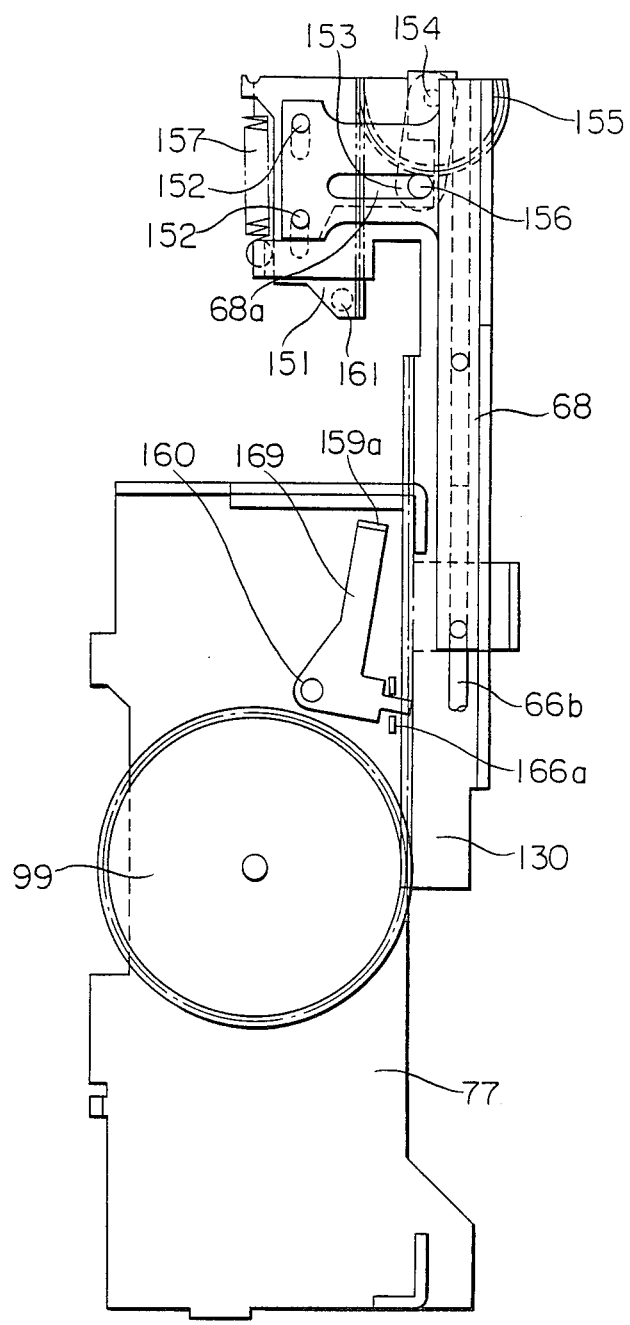
FIG. 20 is a side elevational view of a loading chassis moving mechanism in the state before the tape loading.

The mechanism for causing sliding motion of the loading chasis 64 connected to the load gear 99 will be explained with reference to FIG. 20. FIG. 20 shows the positional relationship in the state before the tape loading, corresponding to the loading mechanism shown in FIGS. 18 and 19. Referring now to FIG. 16 which is an exploded perspective view of the major parts, the chassis guide B 68 is fixed to the left end of the loading chassis 64 and is adapted to slide along the guide shaft 66b. The chassis guide B 68 supports a mode-switching slide plate 151 for a slight sliding motion along the slide plate guide pin 152. The mode-switching slide plate 151 has a rack portion 151a which meshes with a mode gear 155 rotatable as a unit with the mode arm 153. A mode switching pin 156 provided on the mode arm 153 engages with a guide hole 68a formed in the chassis guide B 68. The mode arm 153 and the mode gear 155 are rotatable about the axis of an arm shaft 154 provided on a main slide plate 130. The main slide plate 130 has two elongated holes by which it is supported for sliding movement with respect to the chassis guide B 68. A mode spring 157 held by the mode switching slide plate 151 is retained by the main slide plate 130. The main slide plate 130 has a rack A 130a meshing with a load gear 99 and a rack 130b meshing with a large-diameter portion 158a of an intermediate gear 158. A reference numeral 159 denotes a mode lock plate which is rotatable about a lock plate support shaft 160 on the left substrate 77 and selectively engageable at its end 159a with the mode pin 161 of the mode-switching slide plate 151.

Figure 23:
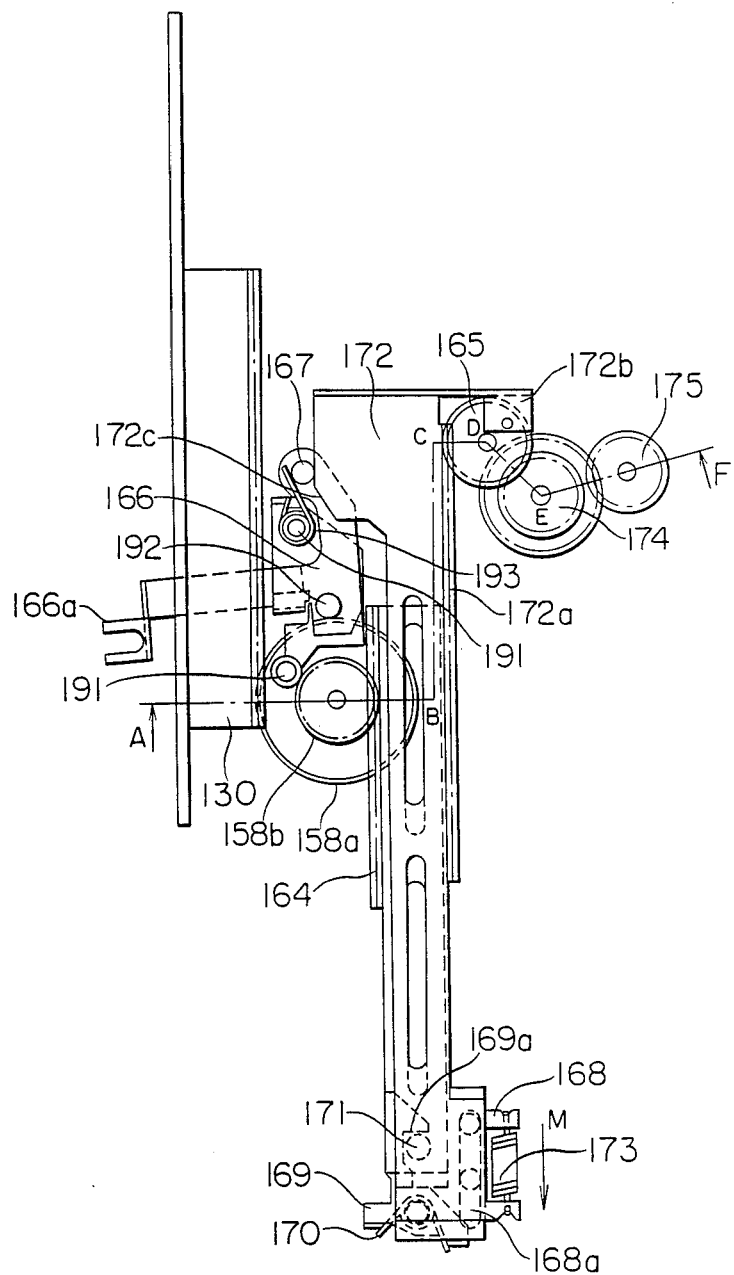
FIG. 23 is a plan view of the loading chassis moving mechanism in the state before the tape loading.
Figure 24:
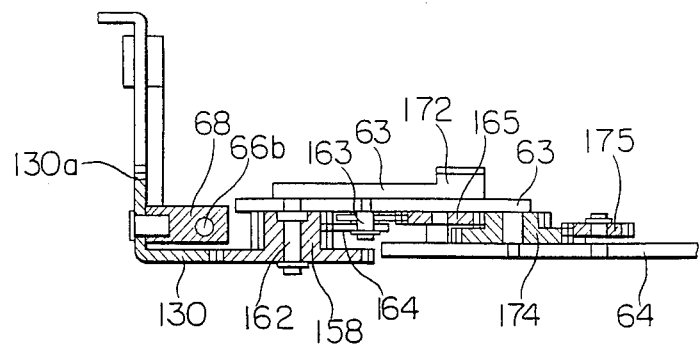
FIG. 24 is a front elevational view of- the loading chassis moving mechanism.

FIG. 23 shows a guide drum drive mechanism connected to the main slide plate 130. FIG. 23 shows the guide drum driving mechanism in the state before the tape loading, as is the case of FIG. 20. FIG. 24 is a sectional view taken along the line A-B-C-D-E-F in FIG. 23. In order to facilitate the understanding, FIG. 24 shows other associated parts such as the driving chassis 63. An intermediate gear 158 which is rotatably supported by an intermediate gear shaft 162 provided on the driving chassis 63 has a large-diameter portion 158a meshing with the rack 130b of the main slide plate 130 and a small-diameter portion 158b meshing with the rack of a sub slide plate A 164 guided by the driving chassis 63 through a slide guide pin 163. A sub-slide plate B 172, which utilizes the slide guide pin 163 as a guide shaft, has a rack portion 172a meshing with a drum drive gear A 165 rotatably supported by the loading chassis 64, a spring retainer portion 172b bent in a U-like form, and a cam portion 172c contactable with a select pin 167 on one end of a select lever 166. The sub slide plate B 172 carries, on its side opposite to the spring retainer portion 172b, a slide lock plate 168 for a slight movement. At the same time, a loading charge spring 173 is connected between the slide lock plate 168 and the sub-slide plate B 172, so as to bias the slide lock plate 168 in the direction of an arrow M within the region afforded by the elongated hole 168a. The slide lock plate 168 rotatably supports the slide lock lever 169 by a support shaft provided thereon. A slide lock spring 170 provided on the support shaft biases the slide lock lever 169 clockwise. The claw 169a of the slide lock lever 169 engages with the slide lock pin 171 provided on the sub slide plate A 164. In this state, the sub-slide plate A 164 and the sub-slide plate B 172 operate as a unit with each other. The drum drive gear A 165 meshing with the rack 172a of the sub-slide plate B 172 engages with a small-diameter gear 174a on the drum drive gear B 174, whereas the large-diameter gear 174b of the drum drive gear B 174 meshes with the drum drive gear C. As will be seen from FIG. 24, the drum drive gears A 165, B 174 and C 175 are mounted on the loading chassis 64. As will be seen from FIGS. 27 and 28, the large-diameter portion 158a of the intermediate gear 158 engages with the small-diameter gear portion 176a of a reel drive gear A 176, whereas the small-diameter portion 158b of the intermediate gear 158 meshes with the large-diameter gear portion 177a of the S1 post drive gear 177. The large-diameter gear portion 176b of the reel drive gear A 176 engages with the small-diameter gear portion 178a of the reel drive gear B 178, whereas the large-diameter gear portion 178b of the same meshes with reel drive gear C 179, so that an overdrive transmission is performed. The reel drive gear C 179 is press-fitted to a slip holder 181 which is rotatably supported by the reel drive gear shaft 180 fixed to the shaft housing 65. The slip holder 181 has an upper flange 181a which is provided with friction members A 182 and B 183 and provides an axis of rotation of the reel drive gear D 184. A reel drive clutch spring 185 (compression spring) is interposed between the reel drive gear D 184 and the reel drive gear C 179, so that the torque of the reel drive gear is transmitted to the reel drive gear D 184 through the friction member B 183. On the other hand, the reel drive gear shaft 180 is provided with a rotatable reel drive plate 187 provided with a reel drive gear E 186 meshing with the reel drive gear D 184. The reel drive plate 187 is biased by a leaf spring 188 into contact with the friction member A 182. Therefore, as a torque is applied to the reel drive gear C 179 in the counter-clockwise direction as viewed in FIG. 27, a counter-clockwise moment is produced in the reel drive plate 137 through the slip holder 181 and the friction member A 182, so that the reel drive gear E 186 is rotated until it meshes with the gear portion 61a of the supply reel base 61, whereby a power transmission path from the intermediate gear 158 to the gear portion 61a of the supply reel base 61 is completed. This is intended for taking up the extracted tape on the supply reel 2 at the time of the tape unloading.

A description will be made hereinunder as to the mechanism for moving the S1 post 31, S2 post 33 and the erase head 58 which are arranged to operate in response to the S1 post drive gear 177, with reference to FIGS. 29 to 31.

The S1 post drive gear 177 is adapted to rotate about an axis which also constitutes the axis of rotation of the select lever 166 shown in FIG. 23. As will be seen from FIG. 31, a drive gear plate 191 is fixed to the driving chassis 63 through a collar 190. The drive gear plate 191 has an S1 post drive gear shaft 192 having a lower large-diameter portion to which the select lever 166 is fixed so as to be urged clockwise by a lever spring 193 (see FIG. 23). The S1 post drive gear shaft 192 also has an upper small-diameter portion which carries rotatably an S1 post drive gear 177. An S1 post gear 194 meshing with the S1 post drive gear 177 is integral with the S1 post 31 and is rotatable about the axis of the S1 post shaft 195. The erase head 58 and the S2 post 33 are fixed to an erase head boat 196. Two collars 198 received by an elongated hole 197a in a boat guide 197, a boat gear 199 having a rack, and a boat retainer 200 are screwed to the erase head boat 196 by means of screws which are driven from the underside of the boat retainer 200. Thus, the erase head boat 196, boat gear 199 and the boat retainer 200 are slidably held by the boat guide 197. A similar pair of collars 201 are received in another elongated hole 197b formed in the boat guide 197. Thus, an S3 boat holder 203 is held by a boat retainer 202 for sliding movement with respect to the boat guide 197. The boat guide 197 is fixed to the driving chassis 63 through a pair of collars 204 and is provided with a boat gear 199 which are drivingly connected to the S1 post gear 194 through an erase intermediate gear 205. An S3 boat 206 to which the S3 post 34 is fixed is held by an S3 boat holder 203 for rotation about the axis of the boat support shaft 207. Usually, the S3 boat is urged counter-clockwise by a boat spring 208, so that a projection 206a of the S3 boat 206 is held in contact with a side surface of the S3 boat holder 203. The U-shaped groove of the S3 boat holder 203 accommodates an S3 boat spring 209, so as to be stretched between the sub-slide plate B 172 and the S3 boat holder 203. By virtue of the tensile force of the boat spring 209, the end surface 172d of the spring retainer 172b of the sub-slide plate 172 is held in contact with the open end surface 203a of the U-shaped groove in the S boat holder 203. A reference numeral 32 designates a tension post which is rotatable about the tension post support shaft 210 and is biased counter-clockwise by a tension spring 211. The tension post 32 is adapted to rotate accompanying the rotation of the S1 post 31, and a post arm 212 of the tension post 32 is adapted to contact with a holder portion 31a of the S1 post 31. FIG. 29 shows the positional relationship of parts in the state after the completion of the loading.

Figure 32:
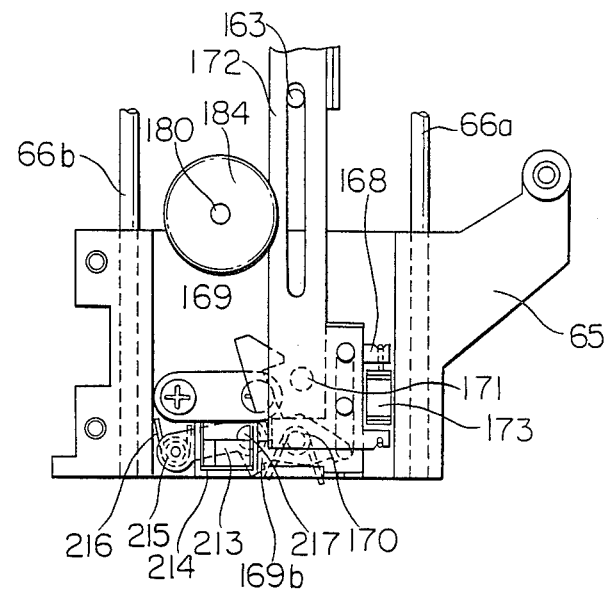
FIG. 32 is a plan view of a cassette detection mechanism.
Figure 33:
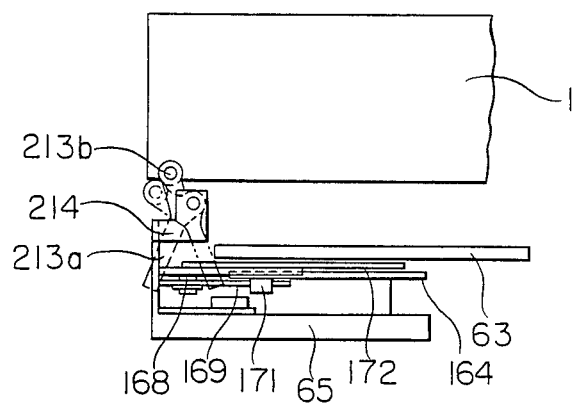
FIG. 33 is a side elevational view of the cassette detection mechanism.
Figure 34:
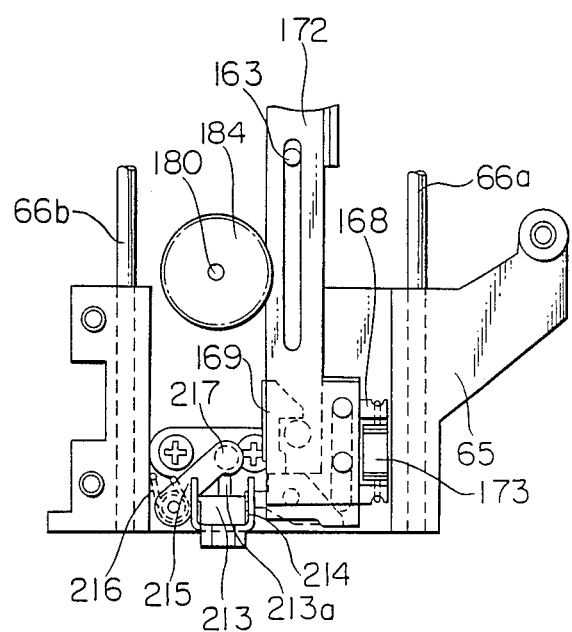
FIG. 34 is a plan view of the cassette detection mechanism as viewed when the standard tape cassette is used.

FIGS. 32 to 34 in combination show an example of the cassette detection means. The cassette detection means has a function to judge, when the cassette holder is mounted in the device, whether the tape cassette 1 is housed in the cassette holder, and to automatically changeover the amount of movement of the guide drum 60, as well as the amount of movement of the housing. To enable this judgement, the described embodiment employs a system which detects the lower portion of the rear surface of the tape cassette 1, although such a system and detecting position are only illustrative and various other detection means can be employed.

An example of the detection means will be explained hereinunder. FIG. 32 shows a state in which the tape cassette 1 has not been mounted, whereas FIG. 34 shows the state in which the cassette 1 is used. An actuator holder 214 for rotatably supporting the actuator 213 is fixed to the shaft housing 65. An unlocking arm 215 is rotatably held in the vicinity of an actuator holder 214. The unlocking arm 215 is biased clockwise by the force of an unlocking spring 216, whereas an unlocking pin 217 provided on the end of the arm and extending downwardly contacts the projection 169b of the slide lock lever 169, thereby rotating the slide locklever 169 counter-clockwise against the slide lock spring 170. Since the force of the unlocking spring 216 is greater than the force of the slide lock spring 170, the slide lock lever 169 is rotated counter-clockwise, thereby disengaging the claw portion 169a of the slide lock lever 169 from the slide lock pin 171 of the sub-slide plate A 164. An arm portion 213a extending downwardly from the actuator 213 contacts with an end of the unlocking arm 215 and is held at a position rotated clockwise by the force of the unlocking spring 216, as shown in FIG. 33. A head 213b which extends upwardly, i.e., in the direction opposite to the arm 213a, is held in the cassette mounting space in this state, but is held in the position shown by full line when the cassette has not been mounted. However, when the tape cassette 1 is inserted, the actuator 213 is rotated counter-clockwise, so that the arm portion 213a of the actuator 213 rotates the unlocking arm 215 counter-clockwise. Consequently, as shown in FIG. 34, the slide lock lever 169 is freed from the unlocking lever 215, so that it is rotated clockwise by the force of the slide lock spring 170, thereby causing the claw portion 169a thereof to engage with the slide lock pin 171 of the sub slide plate A 164.

A description will be made hereinunder as to the tape loading mechanism in the vicinity of the guide drum 60.

Figure 35:
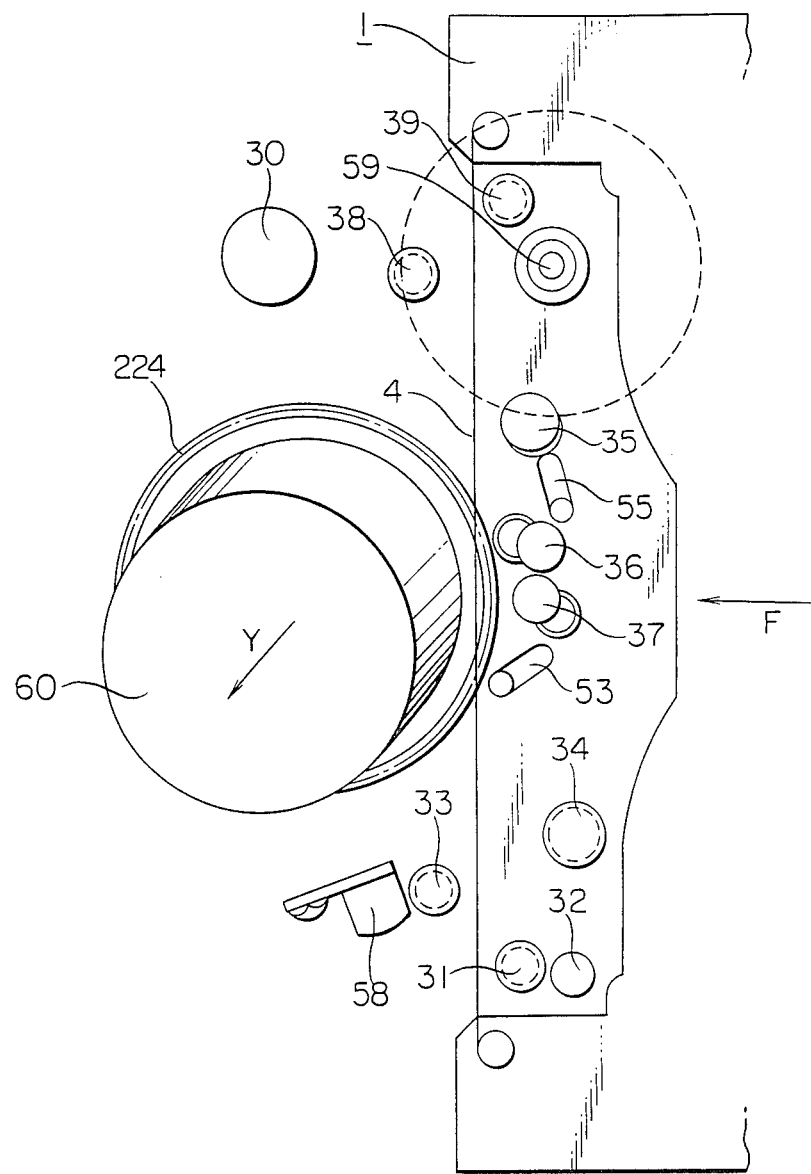
FIG. 35 is a plan view of the tape guide member in the state before the loading.
Figure 36:
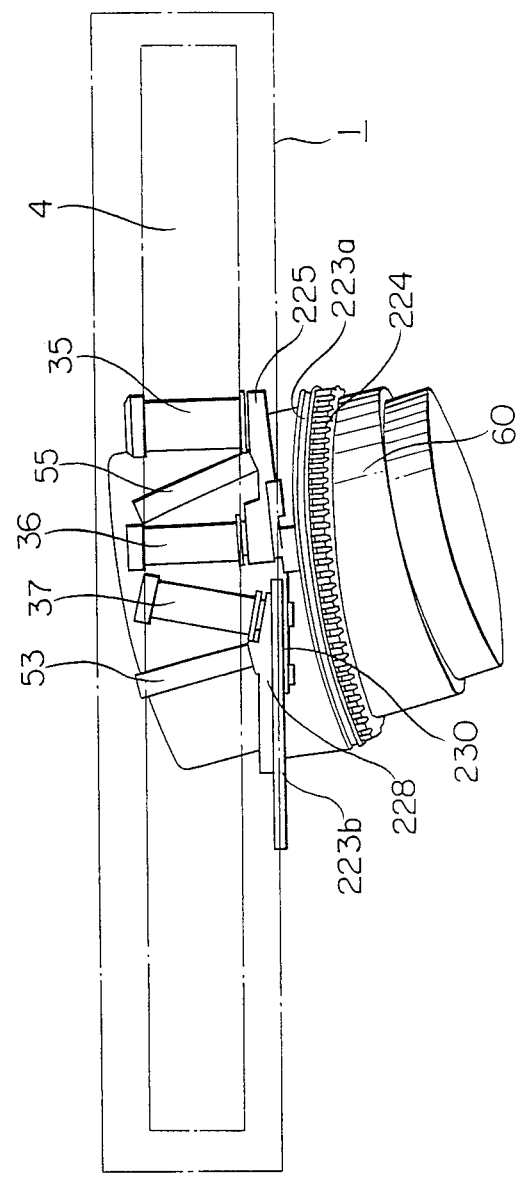
FIG. 36 is a front elevational view of a tape guide member in the state before the loading.

FIGS. 35 and 36 show the arrangement of major parts in the state before the tape loading. FIG. 36 is a view as viewed in the direction of an arrow F in FIG. 35. The description will be made hereinunder with specific reference to FIGS. 43 which is an exploded perspective view. A drum holder 218, which is inclined by a predetermined angle in the direction Y as viewed in FIG. 37 with respect to the loading chassis 64 is formed as a unit with the loading chassis 64. The upper surface 218a of the drum holder 218 rotatably supports a pair of guide rollers 219. The upper surface 218a also supports a roller plate 221 slightly movable about a center pin 220 and rotatably carrying a single guide roller 222. These three guide rollers 219, 222 have a generally diamond-like shape, and engages with a V-shaped groove 223a formed in a loading 223 which is fixed to and integrated with the guide drum 60 at a predetermined degree of inclination (this degree differs from that of inclination of the drum holder) with respect to the guide drum 60, thereby guiding the rotation of the guide drum 60. The loading gear 224 also is fixed to and integrated with the guide drum 60 by the same angle of inclination as the angle of inclination of the loading ring 223 to the guide drum 60. The plane of rotation of the loading ring 223 and the loading gear 224 is parallel to the plane of the upper surface 218a of the drum holder 218. A main boat 225 carrying the T1 post 35, stationary post 55 and the T2 post 36 is rotatably supported by the loading ring 223 for rotation about a boat support pin 226. The main boat 225 is held in a state biased clockwise by means of a main boat spring 227. At the rear side of the main boat 225, a sub-boat 228 provided with the T3 post 37 and the inclined post 53 is disposed for movement along an elongated hole in a guide portion 223b of the loading ring 223. The sub boat 228 is urged towards the mainboat 225 by a sub-boat spring 229. The loading ring 223 is inclined in a manner shown in FIG. 36, but the guide portion 223b for guiding the sub-boat 228 in turn is guided horizontally. A reference numeral 230 designates a sub-boat retaining member secured to the sub-boat 228 by screwes driven from the underside, thereby retaining the sub boat 228 for sliding movement along the elongated hole in the guide portion 223b. A reference numeral 231 designates a sub boat stopper which is adapted to be contacted by the end 228a of the sub boat 228 in the course of loading, thereby locating the sub stopper 228. The sub boat stopper 231 is fixed to the loading chassis 64. A reference numeral 232 designates a main boat stopper which cooperates with a stopper plate 234 in locating the main boat 225.

Figure 1:
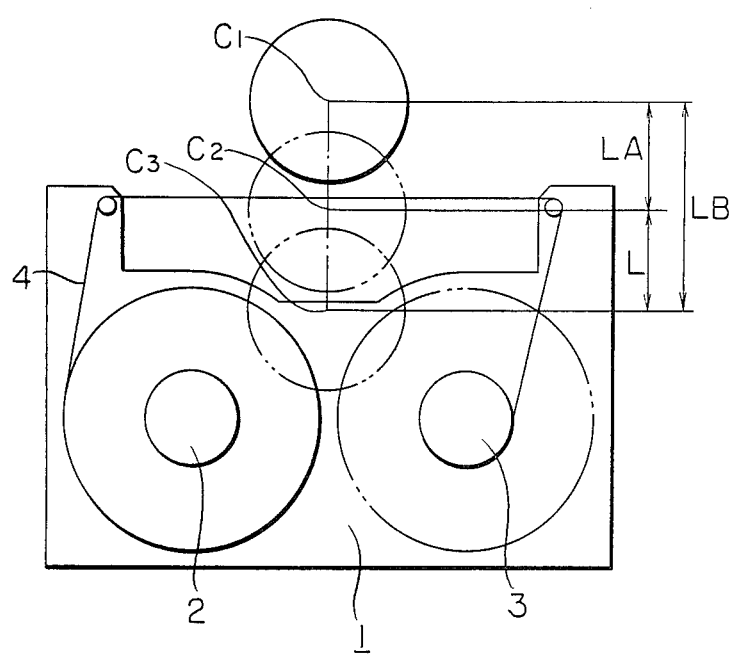
FIG. 1 is a plan view of the path of movement of a guide drum in a tape loading device in accordance with the invention.
Figure 22:
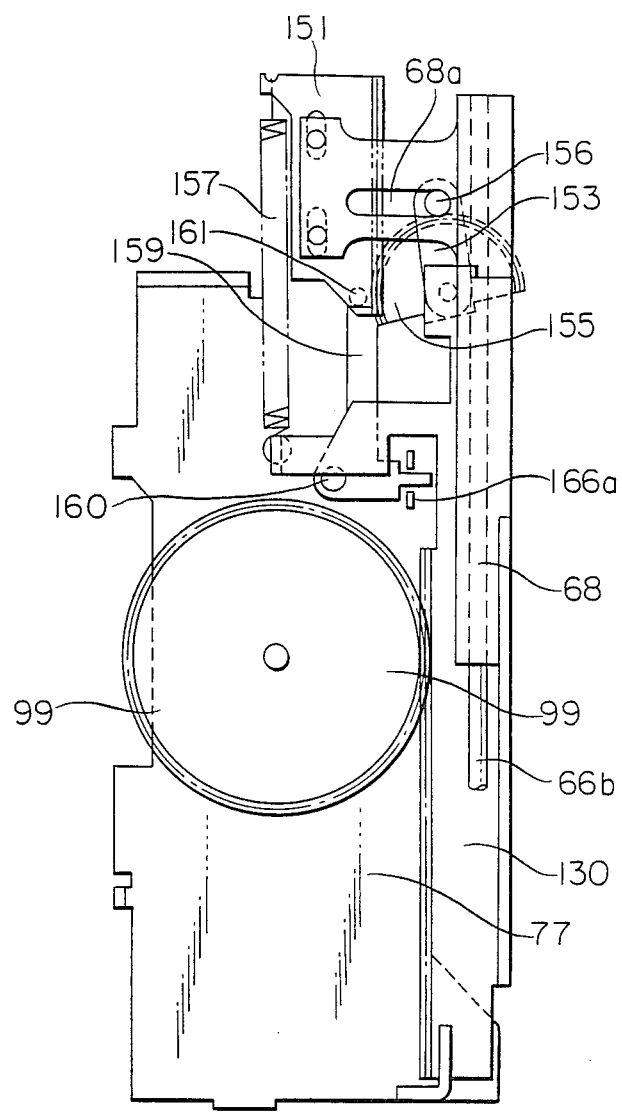
FIG. 22 is a side elevational view of the loading chassis moving mechanism in the state after the tape loading when a standard tape cassette is used.

A numeral 235 designates an S boat guide which guides the S3 post thereby to finally locate the same. Namely, the S3 boat guide 235 has a U-shaped groove 235a which guides the lower projection of the post shaft 34a of the S3 post 34. The operation of the tape loading mechanism in conjunction with the operation of the cassette holder will be explained hereinunder. As the first step, a tape cassette 1 is inserted into the cassette holder, and the cassette holder is depressed and located at a predetermined position. As a result of this operation, the holder gear 95 is rotated clockwise from the position shown in FIG. 18 to the position shown in FIG. 19. The holder gear 95 meshes with the main gear 96, while the main gear 96 is drivingly connected to the unload gear A 97 through the gear lock claw 131. Therefore, the clockwise rotation of the holder gear 95 causes the main gear 96 and the unload gear A 97 to rotate counter-clockwise to the position shown in FIG. 19. As a result, the unload wire 138 is taken up by the drum portion 97a, so that the unload spring 140 is stretched thereby storing a moment or energy for rotating the unload gear A 97 clockwise. The unload gear B 98, which meshes with the unload gear A 97, also rotates counter-clockwise by a predetermined angle into the position shown in FIG. 19 in response to the mounting of the cassette holder. However, the load gear 99 prevents the load gear lock plate 149 from rotating clockwise as viewed in FIG. 18, so that the load spring plate 143 moves away from the load gear lock pin 147, thereby stretching the load spring 146. Since the load spring 146 is disposed in the groove 99a, the load spring 146 is wound towards the unload gear shaft 150 along the substantially spiral groove 99a. This arrangement progressively decreases the change in the length of the load spring 146, thus minimizing the change in the length of the load spring 146, thereby reducing the manual load on the operator for rotating the cassette holder. The specific shape, i.e., a substantially sector-shape of the drum portion 97a of the unload gear A 97 reduces the amount of displacement of the unload spring 140, thus contributing to the reduction of the manual load for rotating the cassette holder. As the clockwise rotation is continued while charging the load spring 146, the load gear pin 141 of the unload gear B 29 comes into contact with the load gear lock plate 149 as shown in FIG. 19, in the end period of the rotation, so that the load gear lock plate 149 is rotated counter-clockwise against the force of the load gear lock spring. As a result, the load gear 99 which has been prevented by the load gear lock plate 149 is released from the same, so that the load gear 99 is rotated clockwise by the force of the load spring 146. The lock claw 87 is urged counter-clockwise by the force of the lock spring 89. Therefore, in the cassette-up state, the holder unlock pin 142 which has been rotated clockwise by the force of the unload spring 140 is held in the rotated position by the lock claw 87. However, since the unload gear B 98 rotates in response to the mounting of the cassette holder, the lock claw 87 is rotated counter-clockwise into engagement with the lock pin 88, as will be seen from FIG. 19. As has been described, according to the invention, the main gear 96, unload gear A 97 and the unload gear B 98 rotate in response to the operation for mounting the cassette holder, but the load gear 99 is unlocked just before the completion of the mounting of the cassette holder, so that it is rotated clockwise by the force of the load spring 146. Since the rotation of the load gear 99 is directly associated with the tape loading operation, it is essential that the loading is ensured with a sufficient margin when the cassette 1 is placed at a predetermined position. To this end, unlike other gears 96, 97, 98, the load gear 99 is adapted to be unlocked as the cassette holder is depressed after the mounting for charging the cassette retaining spring 74. As the unlocked load gear 99 rotates clockwise, the main slide plate 130 moves from the position shown in FIG. 20 to the position shown in FIG. 22. The intermediate gear 158 is then rotated in the course of movement of the main slide plate 130, thereby moving the sub-slide plate A 164 in the direction opposite to the direction of movement of the main slide plate 130 (see FIG. 26). As explained before in conjunction with FIG. 33, the actuator 213 rotates counterclockwise to the position of an imaginary line as a result of the mounting of the tape cassette 1, so that the slide lock lever 169 is rotated clockwise as viewed in FIG. 32 so as to be brought into engagement with the slide lock pin 171. In consequence, a positional relationship as shown in FIG. 34 is obtained, so that the sub-slide plate B 172 and the sub-slide plate A 164 are moved as a unit with each other. The select pin 167, which has been held in contact with the cam portion 172c on the end of the sub-slide plate B 172, is released from the cam portion 172c as a result of movement of the sub slide plate B 172, and is rotated clockwise by means of the lever spring 193. The select lever 166, which is provided at its one end with the select pin 167, engages at its other U-shaped end portion 166a with the mode lock plate 159 shown in FIG. 20. Therefore, when the select lever 166 is rotated, the mode lock plate 159 is rotated counter-clockwise to the position shown in FIG. 22. Since the rotation of the mode block plate 159 is conducted in the initial period of the movement of the main slide plate 130, a further movement of the main slide plate 130 causes the mode lock plate 159 to be positioned in the space in which the mode pin 161 of the mode change-over slide plate 151 moves, whereby the end 159a of the mode lock plate 159 is brought into engagement with the mode pin 161. In consequence, the mode change-over slide plate 151 is stopped by the mode lock plate 159, whereby the arm shaft 154 about which the mode gear 155 is rotated is moved together with the main slide plate 130. Consequently, the mode gear 155 is rotated clockwise to the position shown in FIG. 22. Therefore, the chassis guide B 68 is moved relatively away from the main slide plate 130, thus storing a large spring energy. The rotation of the load gear 99 is thus transmitted directly to the main slide plate 130, whereas the chassis guide B 68 moves only by an amount which is smaller than the amount of movement of the main slide plate 130. That is, the amount of movement of the main slide plate 130 is the same as the amount of movement of the guide drum 60 from the position C1 to the position C3 as shown in FIG. 1, so that the amount of movement of the chassis guide B 68 equals to the amount of movement of the guide drum 60 from the position C1 to the position C2. That is, the amount of relative movement between the main slide plate 130 and the chassis guide caused by clockwise rotation of the mode gear 155 equals to the amount L shown in FIG. 1.

A description will be made hereinunder as to the operation which is triggered by the intermediate gear 158 which is rotated counter-clockwise by the main slide plate 130. As stated before, the sub-slide plate B 172 moves together with the sub-slide plate A 164 in the direction opposite to the main slide plate. The amount of movement, however, is reduced as compared with that of the intermediate gear 158. More specifically, the amount of movement of the sub-slide plate B equals to the length L appearing in FIG. 1. The drum drive gear A 165 provided on the loading chassis 64 moves by the same amount as the chassis guide B 68, while the sub-slide plate B 172 also is moved relatively to the drum drive gear A 165 from the position shown in FIG. 23 to the position shown in FIG. 26. The movement of the sub slide plate B 172 relative to the drum drive gear A 165 causes a rotation of the drum drive gear A 165, which in turn is transmitted through the drum drive gear B 174 to the drum drive gear C 175, thereby rotating the drum drive gear C 175 clockwise.

Figure 29:
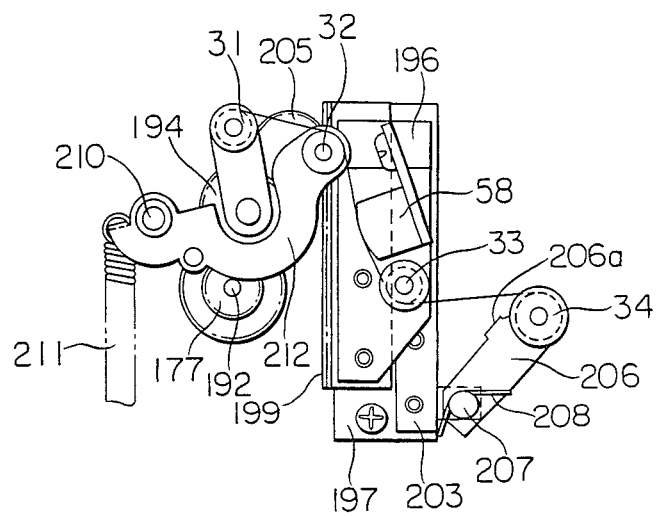
FIG. 29 is a plan view of a tape guide member adjacent the supply reel, in the state after the loading when the S cassette is used.
Figure 30:
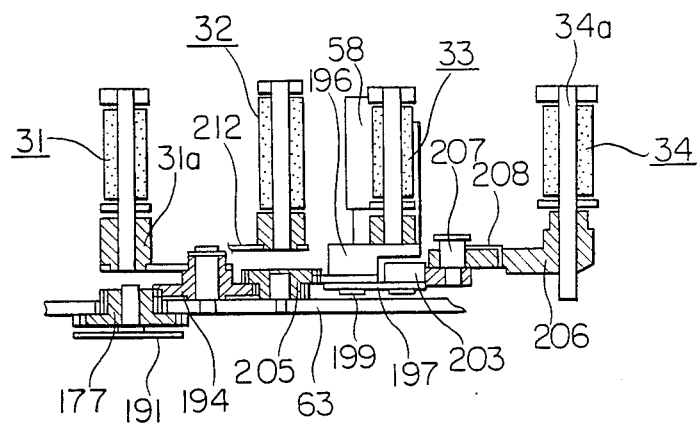
FIG. 30 is a plan view of the tape guide member adjacent the supply reel.
Figure 31:
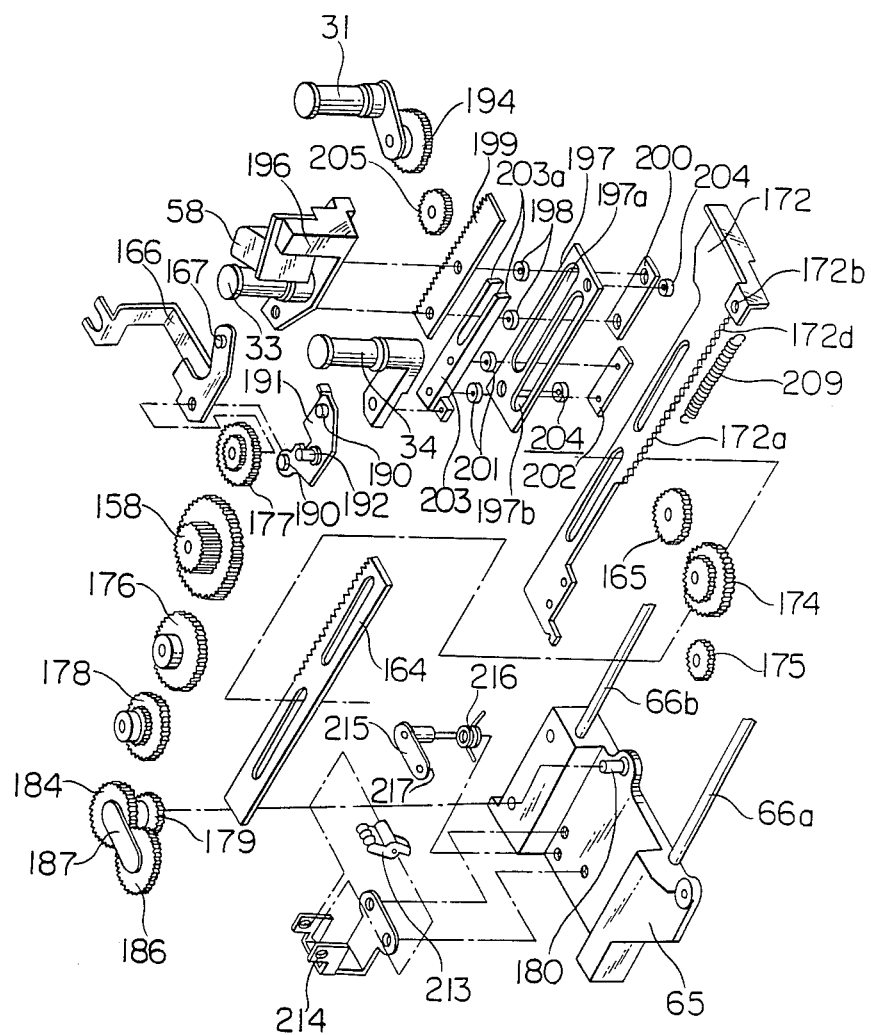
FIG. 31 is an exploded perspective view of the loading chassis moving mechanism.
Figure 40:
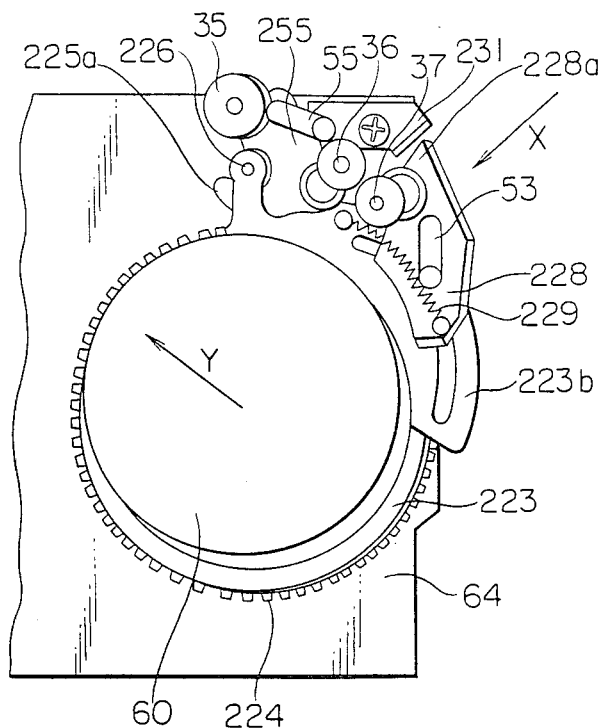
FIG. 40 is a plan view showing the state of a sub boat and a sub boat stopper in the course of the tape loading.

The rotation of the intermediate gear 158 causes also a movement of the S1 post 31, S2 post 33, and the erase head 58 shown in FIGS. 29 and 30. Namely, the S1 post 31 is rotated counter-clockwise, whereas the S2 post 33 and the erase head 58 are moved towards the tape cassette from the position shown in FIG. 35 to the position shown in FIG. 40. The position of the tension post 32 depends on the S1 post 33. Namely, when the S1 post 33 is rotated counter-clockwise, the tension post 32 is rotated counter-clockwise following up the S1 post 33 by the force of the tension spring 211. The S3 boat holder 203, which is connected to the sub-slide plate B 172 through the S3 boat spring 209, is moved in the direction opposite to the direction of movement of the erase head 58, in response to the movement of the sub-slide plate B 172. In the initial stage of the movement of the sub-slide plate B 172, the S3 boat 206 is urged onto the side surface of the S3 boat holder 203 by the force of the boat spring 208, so that the S3 boat guide 235 provided on the loading plate 64 approaches the S3 boat 206, thereby gradually rotating the S3 boat in the clockwise direction towards the guide drum 60. Finally, the S3 boat 206 is urged and positioned in contact with the terminal end of the U-shaped groove 235a in the S3 boat guide 235. The operation of the tape guide members between the supply reel 2 and the guide drum 60 is thus completed as shown in FIG. 40.

Figure 26:
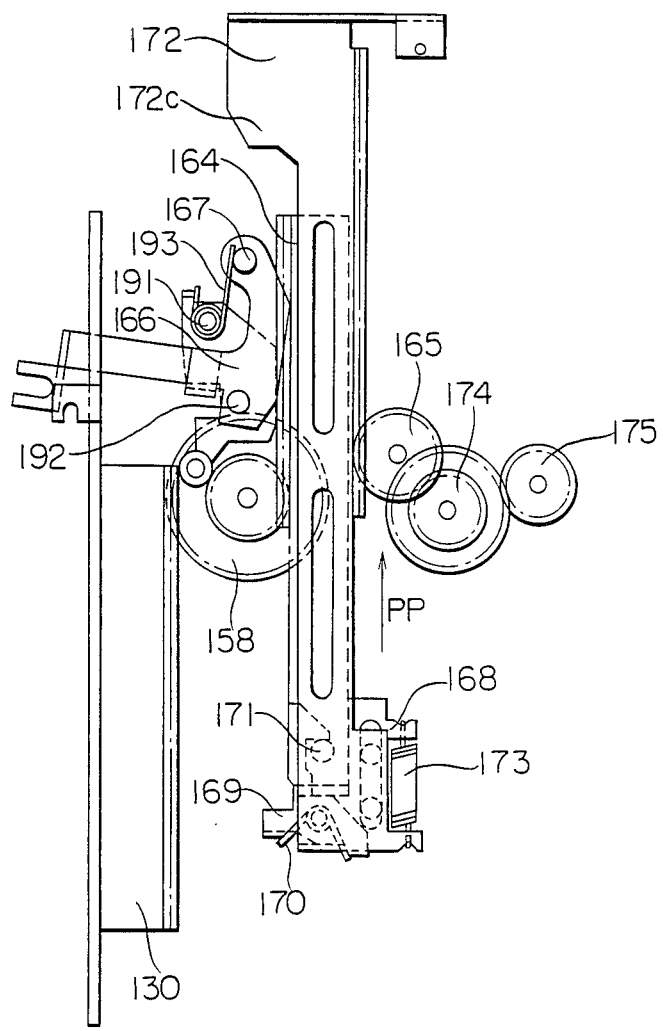
FIG. 26 is a plan view of the loading chassis moving mechanism in the state after tape loading when a standard tape cassette is used.
Figure 37:
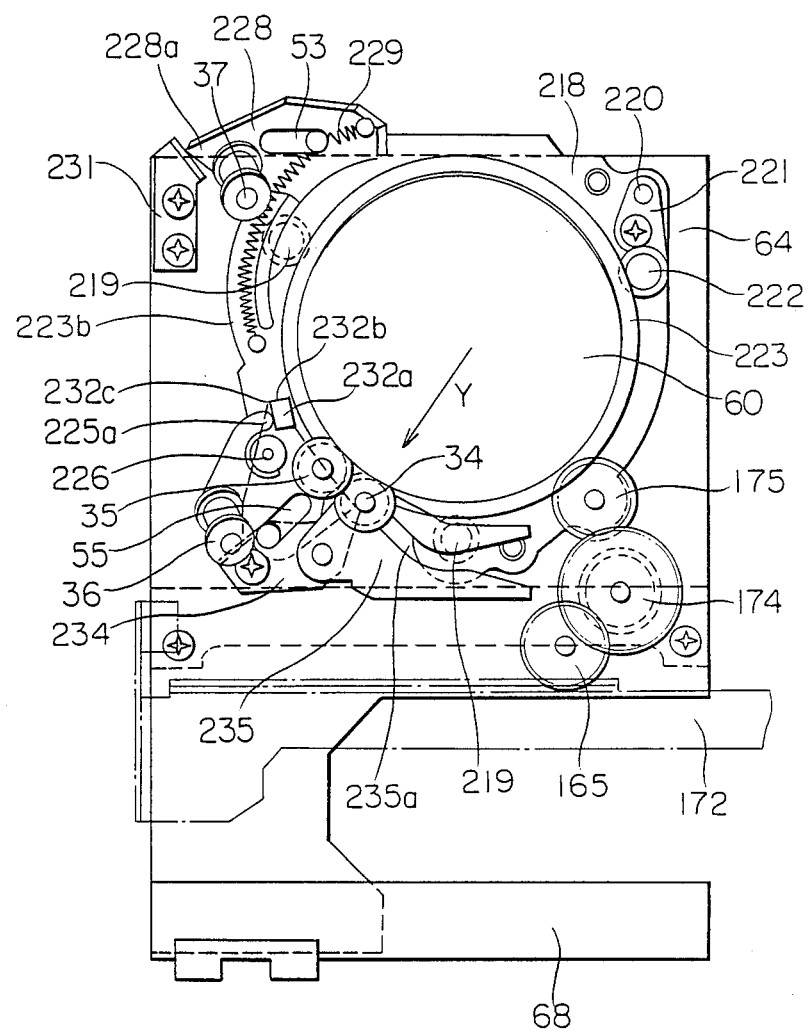
FIG. 37 is a plan view of parts on the loading chassis in the state after the loading.
Figure 38:
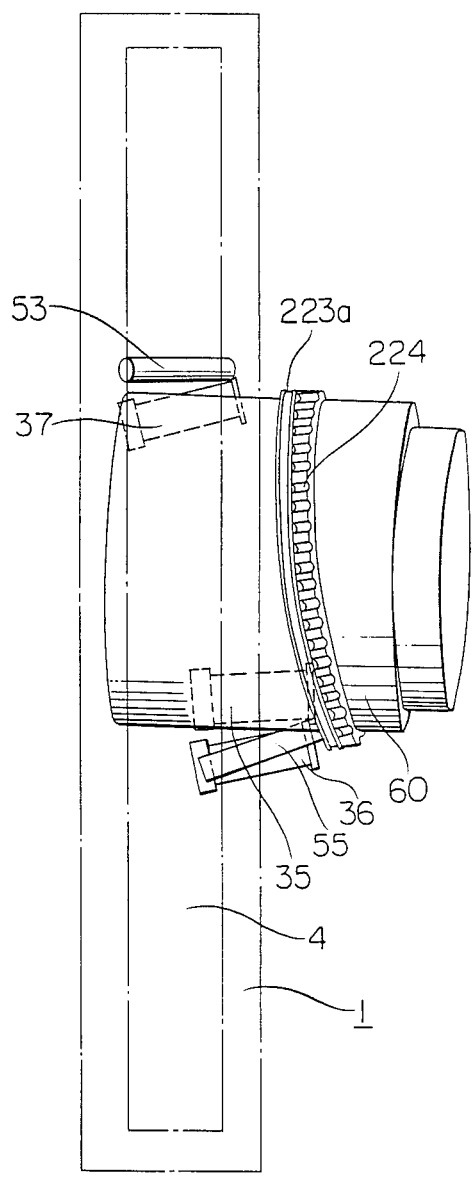
FIG. 38 is a front elevational view of a tape guide member in the state after the loading.
Figure 39:
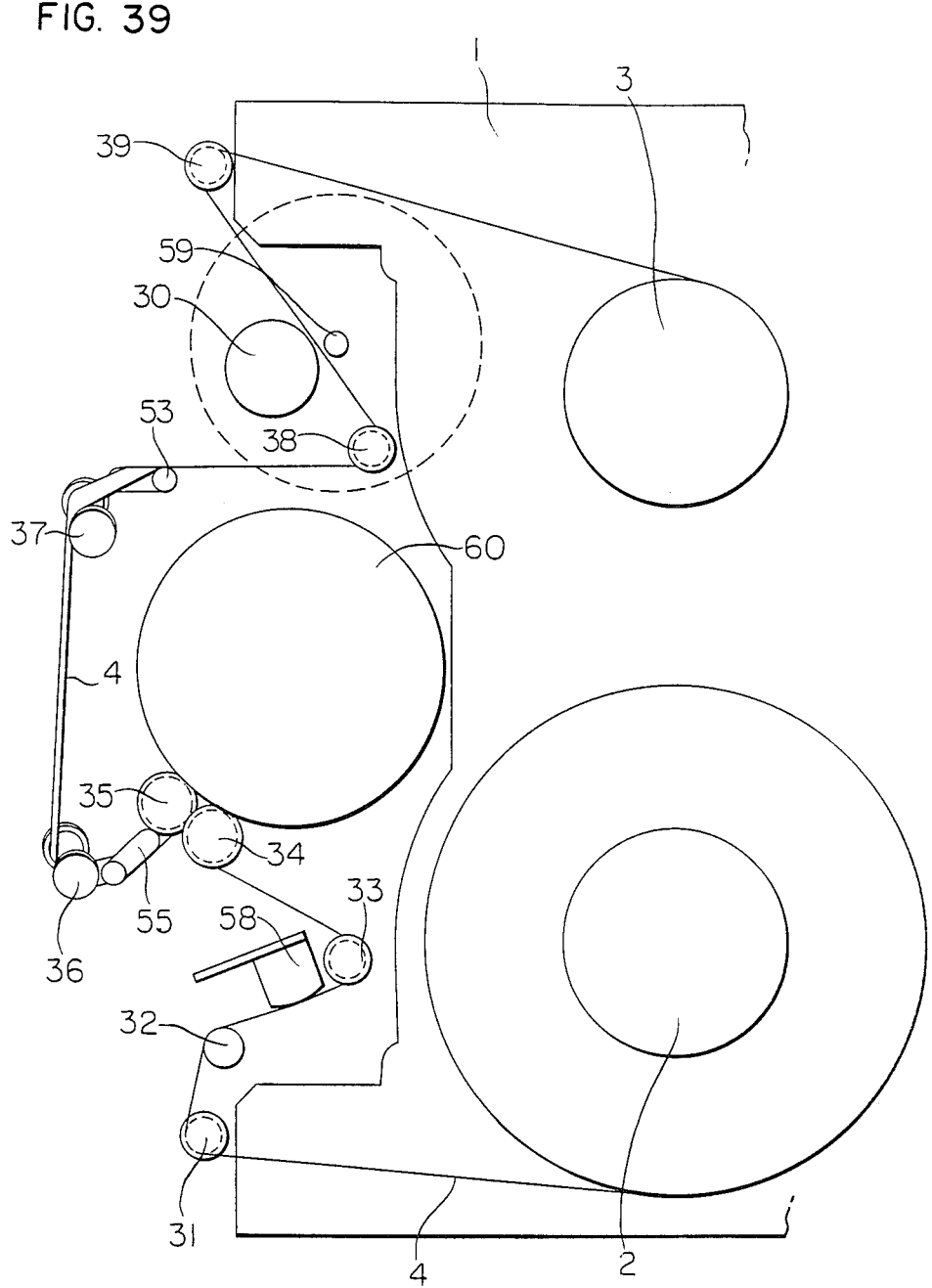
FIG. 39 is a plan view of the tape guide member in the state after the tape loading when the standard tape cassette is used.
Figure 41:
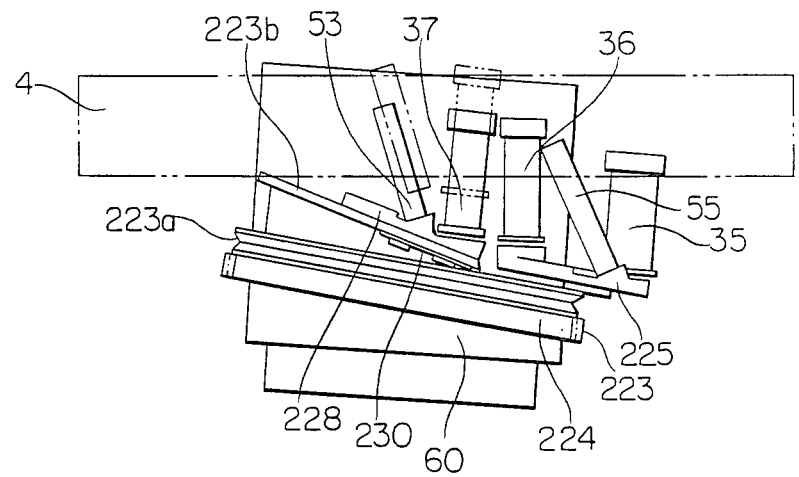
FIG. 41 is a view as viewed in the direction of an arrow X in FIG. 40.
Figure 42:
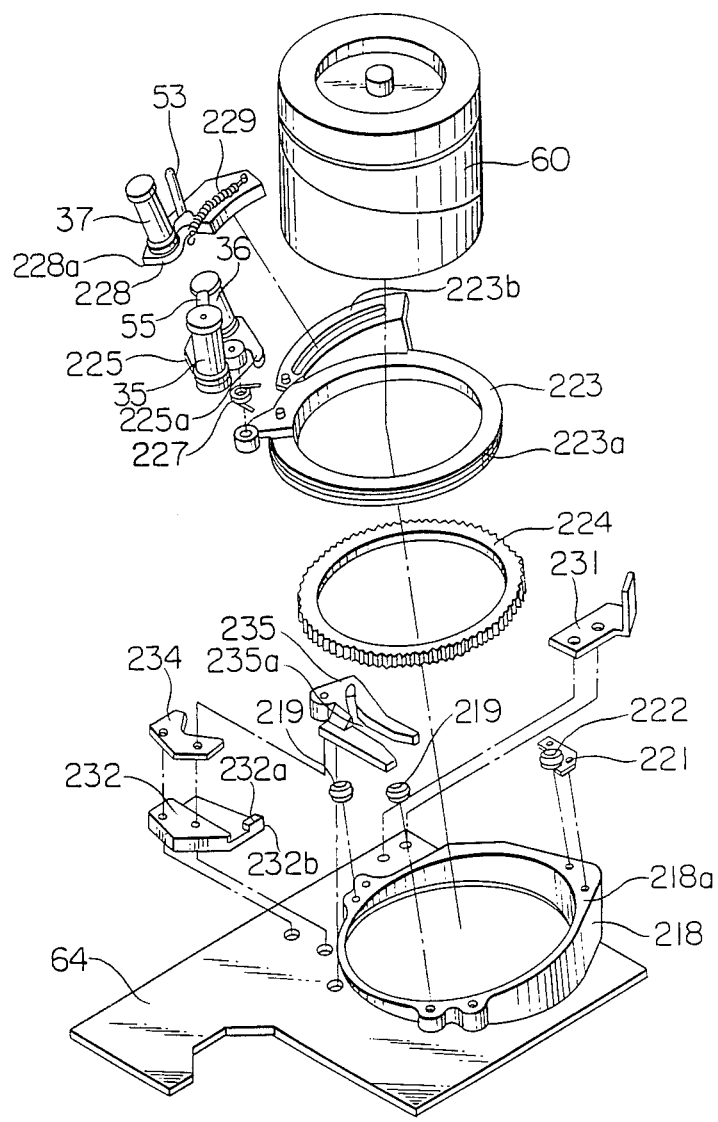
FIG. 42 is an exploded perspective view of major parts of the tape loading device.

A description will be made hereinunder as to the operation of the guide drum 60, main boat 225 and the sub boat 228. The loading chassis 64 is integral with the chassis guide B 68 so that, when the load gear 99 and the main slide plate 130 travel to a predetermined distance LB, the relative position between the loading chassis 64 and the tape cassette 1 is changed by the amount LA shown in FIG. 7. Consequently, the guide drum 60 is moved from the position C1 to the position C2. As a result of the movement, the guide drum 60 is urged counter-clockwise, because the torque of the drum drive gear C 175 is transmitted to the loading gear C 175. The main port 225 is biased counter-clockwise by the force of the main boat spring 227, so that the T1 post 35, stationary post 55 and the T2 post 36 are held in positions shown in FIGS. 35 and 36, in the state before the loading. On the other hand, the T3 post 37 and the inclined guide post 53 are in the opening in the tape cassette 1 as shown in FIGS. 35 and 36, because the sub-boat 228 is urged towards the main boat 225 by the sub-boat spring 229. As the loading chassis 64 is moved towards the cassette 1 while rotating the loading gear 224 counter-clockwise, the end 228a of the sub boat 228 comes into contact with the sub-boat stopper 231 provided on the loading chassis 64, after about 150° rotation of the loading gear 224. FIG. 40 is a plan view of the parts in this state, while FIG. 41 is a view as viewed in the direction of an arrow X. The axis of rotation of the loading ring 223 is inclined by a predetermined angle in the direction Y as explained before, so that the T1 post 35 and other posts down to the inclined guide post 53 take the highest position in the state before the loading as shown in FIG. 35, whereas, in the state shown in FIG. 40, the positions of these posts are considerably low as compared with the tape 4 as will be understood from FIG. 41. As the loading gear 224 is further rotated from this position, the sub-boat 228 is moved along the elongated hole in the guide portion 223b of the loading ring 223 against the force of the sub-boat spring 229, and is stopped by the end of the elongated hole. In this state, the guide portion 223b of the loading ring 223 presents a plane which is inclined at a predetermined angle to the loading ring 223, so that the sub boat 228 is raised with respect to the loading ring 223 and, when the loading is completed, the T3 post 37 and the inclined guide post 53 are moved from the position shown by full line to the position shown by imaginary line. On the other hand, as the loading gear 224 further rotates, the projection 225a of the mainboat 225 comes into contact with the right side surface 232b of the projection 232a provided on one end of the main boat stopper 232. Then, as the loading gear 224 further rotates, the main boat 225 starts to rotate counter-clockwise about the boat support pin 226, against the force of the mainboat spring 227. As a result, the projection 225a of the main boat 225, which has been held in contact with the right side surface 232b of the projection 232a of the main boat stopper 232 is moved into contact with the upper portion 232c of the same. Consequently, the main boat 225 is rotated about 120° so that the T1 post 35 approaches the T1 post 35 as shown in FIG. 37. In this state, the main boat 225 is located by the main boat stopper 232 and the stopper plate 234. The loading gear 224 is thus stopped. However, since the design is such that the amount of rotation of the drum drive gear A 165 is slightly greater than the require amount of rotation of the loading gear 224, the stroke of the loading chassis 64 towards the tape cassette 1 after the stopping of the loading gear 224 causes the sub slide plate B 172 to move towards the tape cassette 1, as shown in FIG. 26. The sub-slide plate 164 is moved by a predetermined amount, while the sub-slide plate B 172 is slightly moved in the opposite direction. Since the slide lock lever 169 is held in engagement with the slide lock pin 171 of the sub-slide plate A 164, the slide lock lever 169 and the slide lock plate 168 are moved together with the sub-slide plate A 164, whereby the loading charge spring 173 is stretched thereby urging the sub slide plate B 172 in the direction PP. This urging force in turn urges the loading gear 224 in the loading direction. In other words, this force strongly presses the main boat 225 against the main boat stopper 232. Although the guide drum 60 is inclined as shown in FIG. 35 in the state before the loading, it is inclined by the lead angle in the direction A when the loading is completed as shown in FIG. 2, so as to satisfy a so-called "U loading tape path condition". Although the description of operation and movement of the pinch roller 30, T4 post 38 and the T5 post 39 has been omitted, it will be understood that these parts can be moved to predetermined positions by a conventional means by making use of the force of the sub-slide plate A as the input, insofar as the pinch roller 30 and the posts 38, 39 are perpendicular to the driving chassis 63. FIG. 39 shows the state after the completion of the loading process explained hereinbefore.

Figure 27:
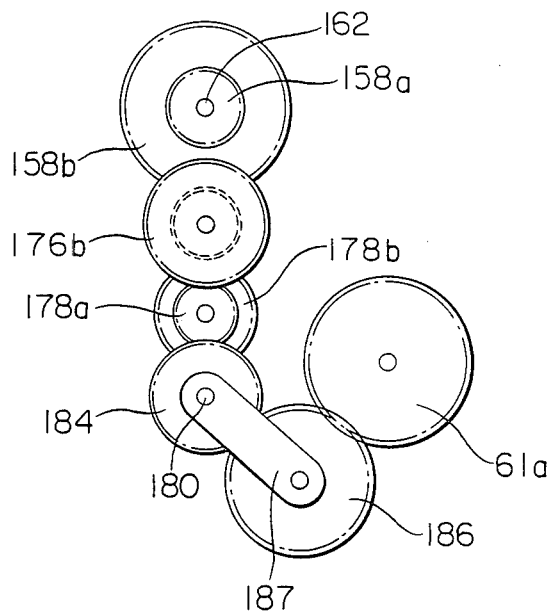
FIG. 27 is a plan view of a supply reel driving mechanism.
Figure 28:
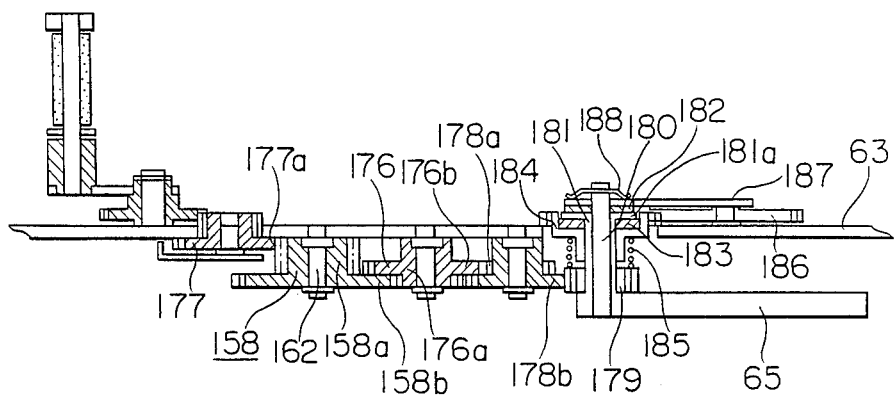
FIG. 28 is a sectional view of a supply reel driving mechanism.

A description will be made hereinunder as to the tape unloading operation and the cassette eject operation. Upon receipt of a cassette eject instruction, a motor (not shown) operate to apply a force to the unlocking portion 131a of the gear lock clow 131 in the direction FA, thereby rotating the rear lock claw 131 in the clockwise direction against the gear spring 135, so that the gear lock claw 131 is brought out of engagement with the gear lock pin 134. Consequently, the unload gear A 97 is rotated clockwise by the force of the unload spring 140 and the unload gear B 98 also starts to rotate counter-clockwise. The counter-clockwise rotation of the unload gear B 98 causes the rotating portion 143a of the load spring plate 143 and the load gear lock pin 147, thereby loosening the load spring 146 which has been stretched between the unload gear B 98 and the load gear 99 so as to urge the main slide plate 130 in the loading direction. Therefore, the unload gear B 98 and the load gear 99 rotate counter-clockwise as a unit with each other, with the retaining portion 143a of the load spring plate 143 and the load gear lock pin 147 held in contact with each other and, finally, the load gear lock pin 147 moves over the claw portion of the load gear lock plate 149, thus attaining the positional relationship shown in FIG. 18. In this state, the counter-clockwise urging force exerted by the load gear pin 141 on the load gear lock plate is dismissed, so that the load gear lock plate 149 is allowed to rotate by a predetermined angle by the force of the load gear lock spring 148 so as to become engageable with the load gear lock pin 147. On the other hand, the main slide plate 130 also starts to move in the unloading direction as a result of the counter-clockwise rotation of the load gear 99. In this state, the mode spring 157 stretched between the main slide plate 130 and the mode switching slide plate 151 acts to move the mode switching slide plate 151 and the main slide plate 130 towards each other, thereby to cause the mode gear 155 to rotate 180° in the counter-clockwise direction, until the mode switching pin 156 is stopped by the lower end of the guide hole 68a in the chassis guide B 68. When the rotation is stopped, the main slide plate 130 and the chassis guide B 68 move in the unloading direction as a unit with each other. In consequence, the S1 post 31, S2 post 33 and the erase head 58 perform an operation reverse to the loading operation, i.e., unloading operation, in response to the operation of the main slide plate 130. On the other hand, since the post arm 212 contacts the holder portion 31a of the S1 post 31, the tension post 32 is rotated clockwise by being pushed by the S1 post which rotated clockwise, and is moved together with the S1 post 31 into the opening of the tape cassette 1. The S3 boat holder 203, which is equipped with the S3 post 34, is moved towards the reel with the end surface 172d of the spring retainer portion 172b of the sub-slide plate B 172 held in contact with the S3 boat holder 203 and open end surface 203 of the U groove, because the sub-slide plate B 172 moves towards the tape cassette 1 together with the sub slide plate A 164. In consequence, the S3 boat 206 is released from the S3 boat guide 235, so that the projection 206a is held in contact with the side surface of the S3 boat holder 203 by the force of the boat spring 208. On the other hand, the load gear 224 also rotates clockwise by the rotation of the drum drive gear A 165 which is turn is caused by the relative movement between the sub slide plate B 172 and the drum drive gear A 165. The main boat 225 is returned by the main boat spring 227 in the clockwise direction as it is disengaged from the projection 232a on the main boat stopper 232. The sub-boat 228 also is moved towards the main boat 225 by the force of the sub-boat spring 229 and is then moved together with the main boat 225 and as a unit with the loading ring 223 and the guide drum 60 to the position shown in FIG. 35 and is then held at this position. The T4 post 38, pinch roller 30 and the T5 post 39 are reset to the predetermined position following up the above-explained unloading operation. A supply reel drive mechanism 61 is used for the purpose of taking up the slack of the tape caused by the unloading operation. The detail of the drive mechanism for the supply reel base 61 is shown in FIG. 27. As stated before, the reel drive plate 187 has a frictional transmission function, so that the counter-clockwise rotation of the reel drive gear C which in turn is caused by clockwise rotation of the intermediate gear 158 in turn causes a clockwise rotation of the reel drive plate 187. In consequence, the reel drive gear E meshing with the reel drive gear E 186 is brought into engagement with the gear portion 61a of the reel base 61. Since the reel drive gear D 184 is frictionally driven by the reel drive gear C 179, any change in the required number of rotation of the reel base due to a variation of the amount of tape which is wound on the supply reel can be absorbed by virtue of slip, provided that the required number of rotation is set to be slightly greater than the number of rotation which is required when there is no tape at all. Immediately before the completion of unloading, the holder unlock pin 142 of the unload gear B 98 rotates the lock claw 87 clockwise against the force of the lock spring 89. In consequence, the lock pin 88 is disengaged from the lock claw 87, so that a garage holder is rotated clockwise as shown in FIG. 10 and then stopped. During the rotation of the garage holder, the front cover 5 and the rear cover 6 are closed and, since the projection 83a of the cover unlock lever 83 is retracted from the tape cassette 1, the front and rear covers 5, 6 become unopenable. As a result of the rotation of the garage holder, the main gear 96 meshing with the holder gear 95 rotates together with the gear lock claw 131 clockwise from the position shown in FIG. 19 to the position shown in FIG. 18. As a result, the gear lock pin 134 of the unload gear A 97 and the gear lock claw 131 are brought into engagement with each other as shown in FIG. 18 immediately before the completion of rotation of the cassette holder. Furthermore, the opener 93 also is reset in the clockwise direction by the force of the opener reset spring 94. In addition, the actuator of the cassette detection means shown in FIG. 33 is returned to the position shown by full line as the tape cassette 1 is extracted from the cassette holder, so that the sub-slide plate A 164 which has been moved towards the reel base is disengaged from the sub-slide plate B 172 as shown in FIG. 32. Thus, all the parts and mechanisms are reset to the state before the mounting of the cassette.

A description will be made hereinunder as to the case where the cassette holder is mounted without accommodating a tape cassette 1 therein. The description will be focused mainly on the point of difference from the case where the cassette holder accommodates the tape cassette 1.

Figure 21:
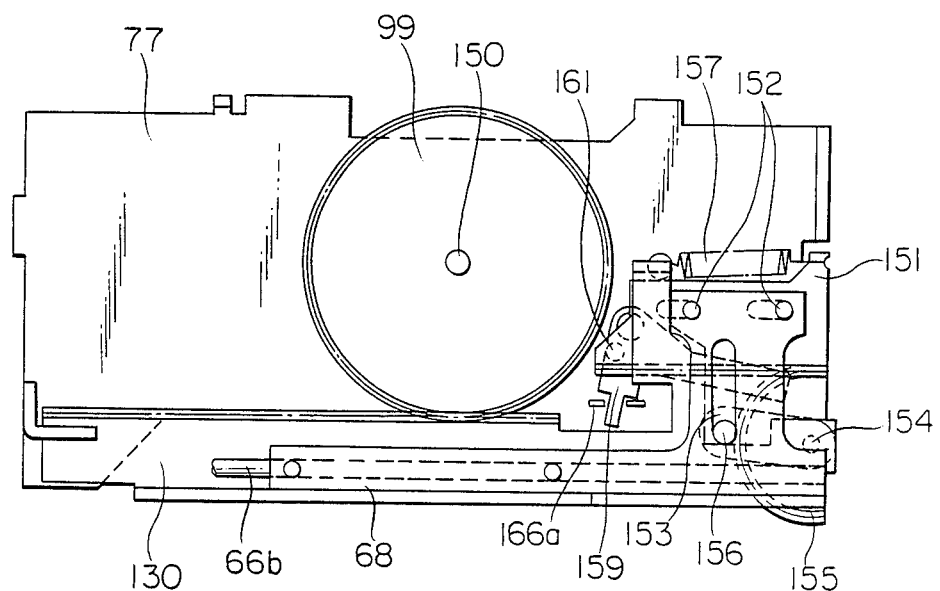
FIG. 21 is a side elevational view of the loading chassis moving mechanism in the state after the loading when as S cassette is used.
Figure 25:
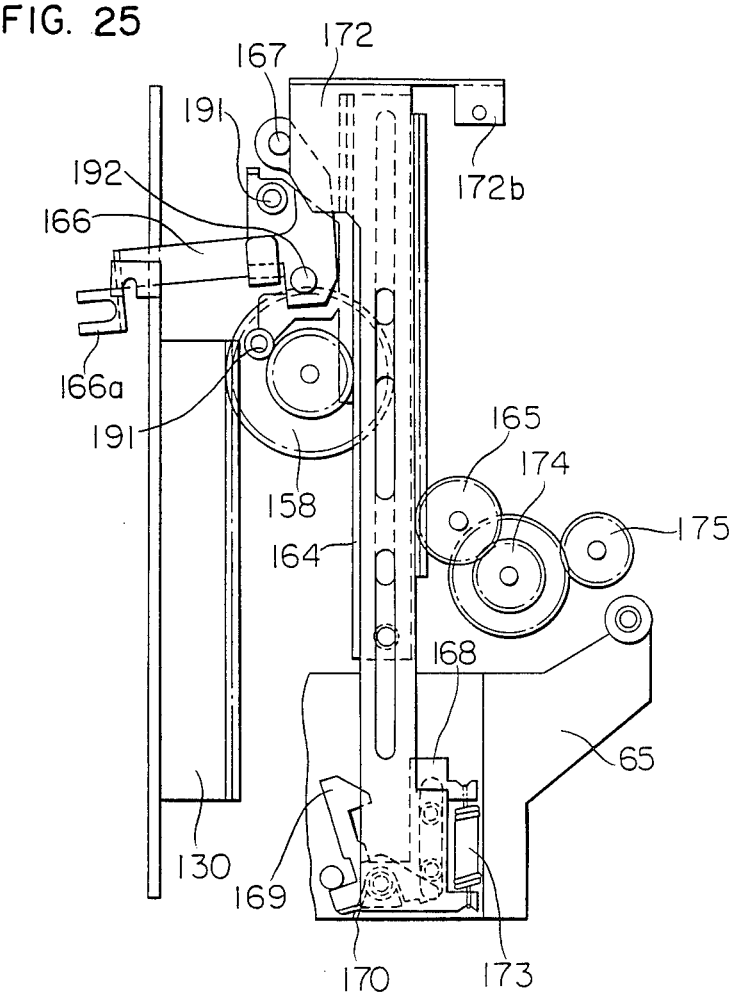
FIG. 25 is a plan view of the loading chassis moving mechanism in the state after the tape loading when an S cassette is used.

Since there is no tape cassette in the cassette holder, the actuator remains in the position of full line, so that, although the sub slide plate A 164 is moved by the intermediate gear 158 in the direction opposite to the main slide plate 130, the sub slide plate B 172 is fixed at the position shown in FIG. 32. On the other hand, the main slide plate 130, sub slide plate A 164, and the sub slide plate B 172 are moved from the positions shown in FIG. 23 to the position shown in FIG. 25. In addition, since the sub-slide plate B 172 is not moved, the select lever 168 is kept in the counter-clockwise position and the mode lock plate 159 also remains in the state before the loading as shown in FIG. 20. Therefore, when the main slide plate 30 is moved by the load gear 99 towards the reel base, the mode pin 161 of the mode switching slide plate 151 does not engage with the mode lock plate 159. In this state, the amount of movement of the main slide plate 130 equals to the amount of movement of the loading chassis 64. In this case, therefore a condition as shown in FIG. 21 is obtained. Although the sub-slide plate B 172 is fixed to the driving chassis 63, the amount of movement of the loading chassis 64 is large as compared with the case where the cassette holder is loaded with the tape cassette 1, so that the positional relationship is obtained as shown in FIG. 25 between the sub-slide plate B 172 and the drum drive gear A 165 at the time of completion of the loading. This positional relationship is equivalent to that shown in FIG. 26 which is attained when the cassette holder accommodates the tape cassette 1. This means that the angles of rotations of the loading ring 223 and the loading gear 224 on the loading chassis 64 are equal to those in the case where the tape cassette 1 is used. Therefore, the behaviour of the main boat 225 and the sub boat 228 is identical to that obtained when the tape cassette 1 is mounted. However, since the position of the sub-slide plate B 172 is unchanged, the position of the S3 boat holder 203 with respect to the driving chassis 63 is not changed from that in the state before the loading. However, the S3 boat 206 approaches the guide drum 60 while being guided by the S3 boat guide 235 provided on the loading chassis 64. Consequently, a tape path as shown in FIG. 43 is obtained when the loading is completed. The positions of the T4 post 38, pinch roller 30 and the T5 post 39 are identical to those shown in FIG. 39 and FIG. 2. The positions of the S1 post 31, tension post 32, erase head 58 and the S2 post 33 also are identical to those shown in FIG. 39. On the other hand, the S3 post 34, T1 post 35, stationary post 55, T2 post 36, T3 post 37, inclined guide post 53 and the guide drum 60 are displaced from the positions shown in FIG. 39 by a distance which is shown by L in FIGS. 1 and 7. However, the unloading operation is materially the same as that performed when the cassette holder holds the tape cassette 1.

Thus, before the tape loading, the guide drum is in the first position and, as the cassette holder with a tape cassette therein is mounted, the guide drum is moved from the first position to the second position so as to form a predetermined tape path, thereby completing the tape loading operation. When the cassette holder which does not contain the tape cassette is mounted, the guide drum is moved from the first position to the third position beyond the second position, and the posts are moved in a predetermined manner as in the case where the cassette holder holds the tape cassette. When the device is not used for the purpose of recording or reproduction with the tape cassette, e.g., when the device is handled or transported with the cassette holder which does not contain the tape cassette, the tape loading device as a whole, including the guide drum and other associated parts, is accommodated by the space which is to be occupied by the tape cassette, so that the device size is reduced to the aimed size, i.e., the tape cassette size.

As has been described, the present invention offers the following advantages:

(1) When the device is used for the purpose of recording or reproduction with a tape cassette, a tape path is formed such as to provide the minimum possible size of the mechanism.

(2) When the tape cassette is not used, i.e., when the device is carried, transported or stored, the device size can be reduced to the ultimate size, i.e., the tape cassette size.

(3) The tape loading device of the invention performs, even when the tape cassette is not mounted on the device, the tape loading operation which is the same as that performed by the device when the tape cassette is mounted. In consequence, a plurality of posts near the tape cassette opening are moved to predetermined positions from the position near the tape cassette opening to the position remote from the guide drum as viewed from the driving chassis. Therefore, when the guide drum takes the position C3 near the reel base, the undesirable occupation of the restricted space between the guide drum and the reel base by these posts can be avoided, unlike the known system in which the guide drum approaches the reel base without conducting the loading operation.

(4) The cassette size mechanism is attained by making use of the guide drum moving mechanism which is adopted for minimizing the device size when the tape cassette is used. Therefore, the reduction of the device size to the cassette size can be attained with minimal number of parts.

A description will be made hereinunder as to another embodiment of the tape loading device of the invention which enables the recording and reproduction by a mechanism of tape cassette size, with a short playing tape which will be explained later.

Figure 61:
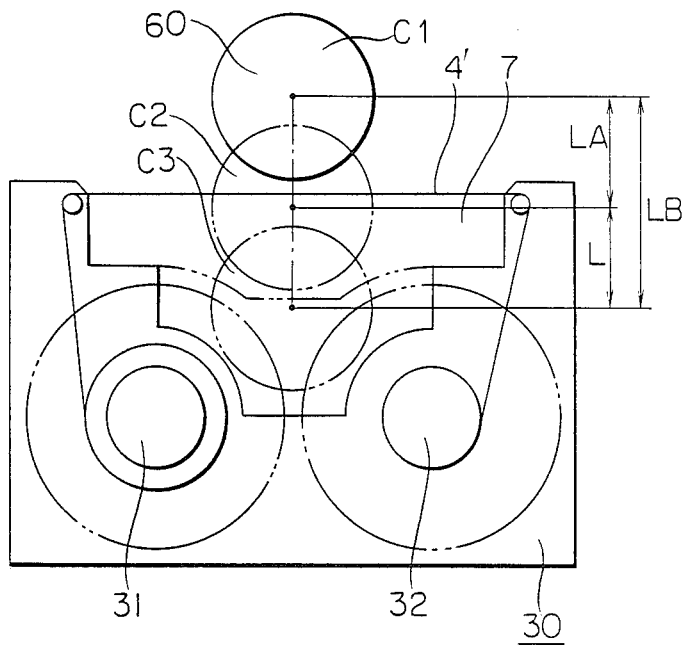
FIG. 61 is a plan view showing the positional relationship between the S cassette and the guide drum.

In the foregoing description of the embodiment with reference to FIG. 1 showing the path of the guide drum 60, it has been described that the guide drum 60 takes the position C1 before the loading and the position C2 is the position where the guide drum is located when the recording or reproduction is conducted with the tape cassette 1. The position C3 has been explained as being the position where the guide drum 60 is disposed when the tape cassette is not mounted. The embodiment which will be described hereinunder intends to enable recording or reproduction by winding the tape over several turns, even when the guide drum 60 is disposed at the position C3. FIG. 61 shows the relationship between the tape cassette and the guide drum 60. It will be understood that, in order to make it possible to dispose the guide drum 60 at the position C3 without lapping the tape cassette, the opening of the tape cassette should be enlarged as shown in FIG. 61. The enlargement of the opening of the tape cassette inevitable decreases the recording time. The tape having such a short recording time will be referred to as the "short playing tape cassette", hereinunder and will be denoted by a numeral 30, in contrast to the 8 mm tape cassette 1 described hereinbefore. In order to identify both types of tape cassettes, the tape cassette 1 which has been explained in connection with the foregoing description will be referred to as the "standard tape cassette", hereinunder. With regard to the short playing cassette 30, the inventors have already proposed a "Tape Cassette for Short Time Recording", in E.P.C. Patent Laid-Open No. 0153137. The outline of this proposal will be explained hereinunder with reference to the drawings.

Figure 62:
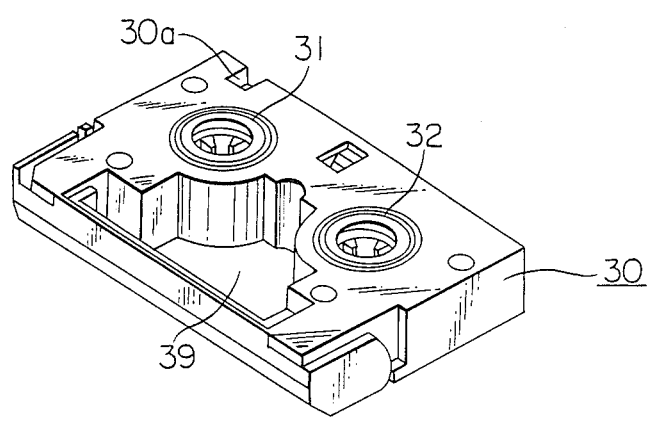
FIG. 62 is a perspective view of short playing tape cassette as viewed from the lower side thereof.
Figure 63:
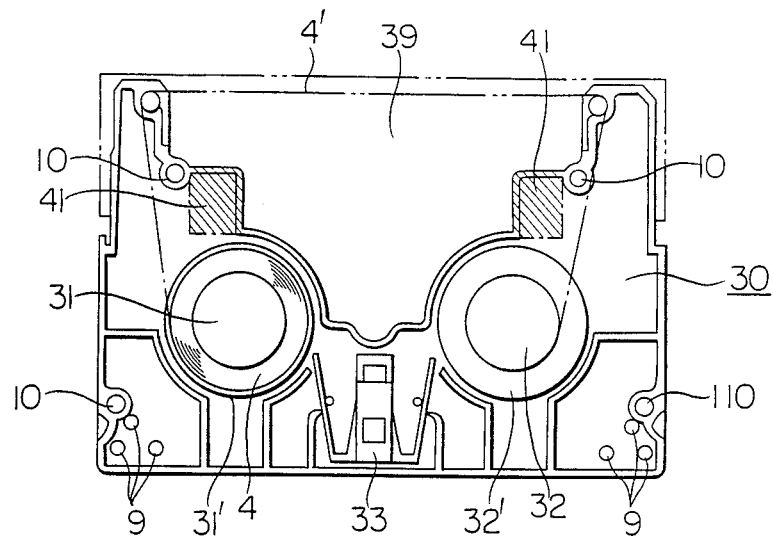
FIG. 63 is a plan view of the short playing tape cassette.

FIG. 63 is a plan view of the short playing cassette (abbreviated as "S cassette", hereinunder), while FIG. 62 is a perspective view as viewed from the underside. The S cassette 30 is almost the same in configuration and size as the standard tape cassette 1, but the construction is different in the following respects. The flanges 31', 32' of the reels 31, 32 have a reduced diameter as compared with the flanges of the reels in the standard tape cassette, by virtue of the shortened recording time. This in turn permits a remarkable increase in the size of the opening 39 in the front side of the tape cassette for the extraction of the tape 4'. The hatched area 41, which is a service area for the standard tape cassette 1, is not included in the opening 39 in view of an interchangeability. A reference numeral 33 designates a reel lock. Other portions such as the front cover 5, rear cover 6, cover lock mechanism are the same in the functions, shapes and sizes as those of the standard tape cassette 1. Thus, only difference in function between the standard tape cassette 1 and the S cassette 30 is the recording time, and a perfect interchangeability is ensured between the standard tape cassette 1 and the S cassette 30.

In order that the device be operable equally both with the S cassette 30 and the standard tape cassette 1, it is necessary to provide a tape running system which permits a stable running of the tape regardless of the position of the guide drum 60.

Figure 4:
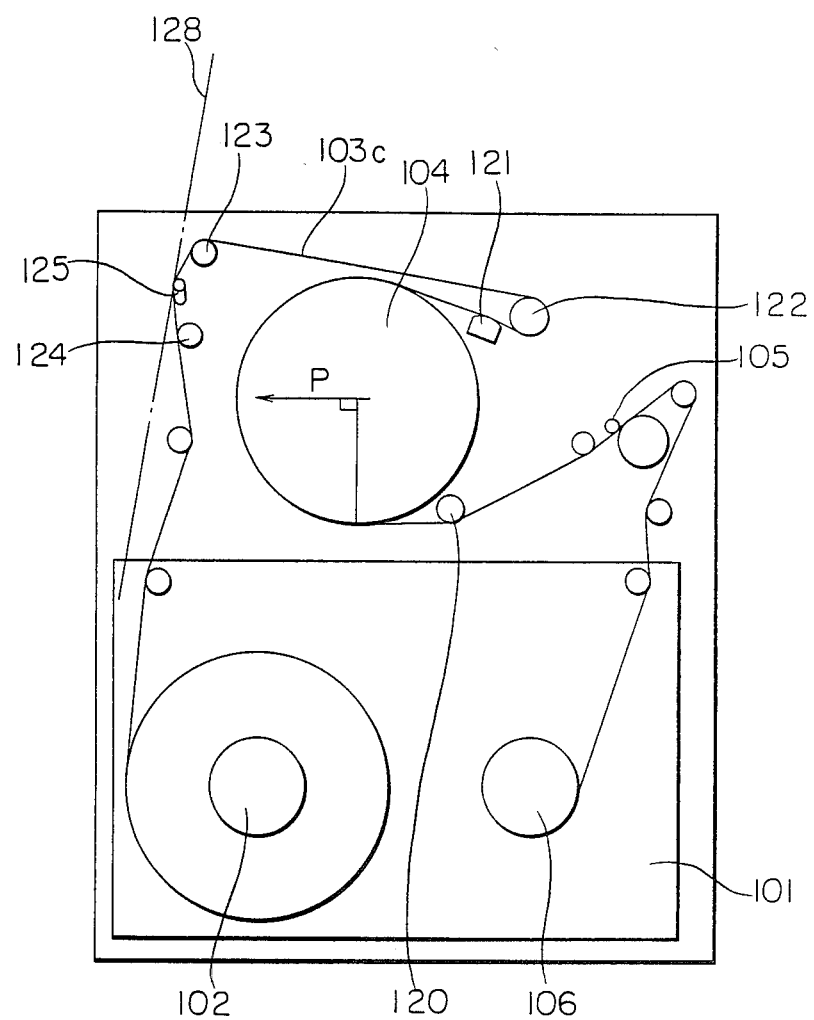
FIG. 4 is an illustration of the loading tape path.
Figure 5:
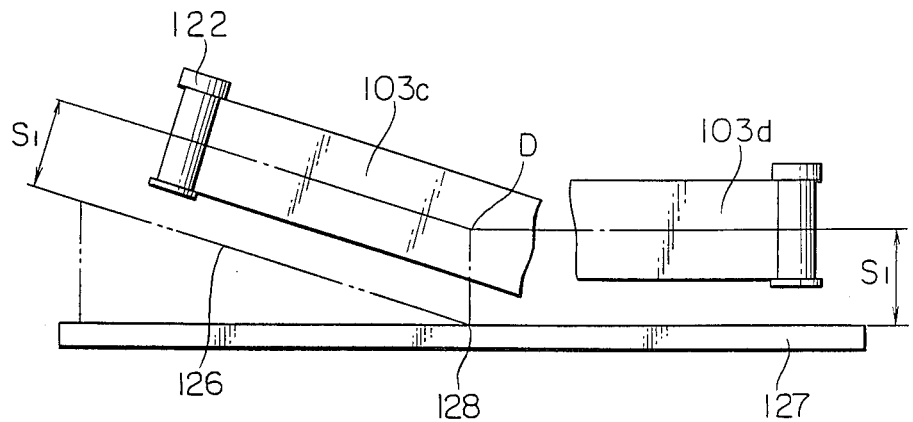
FIG. 5 is an illustration as viewed in the direction of an arrow K in FIG. 6.
Figure 6:
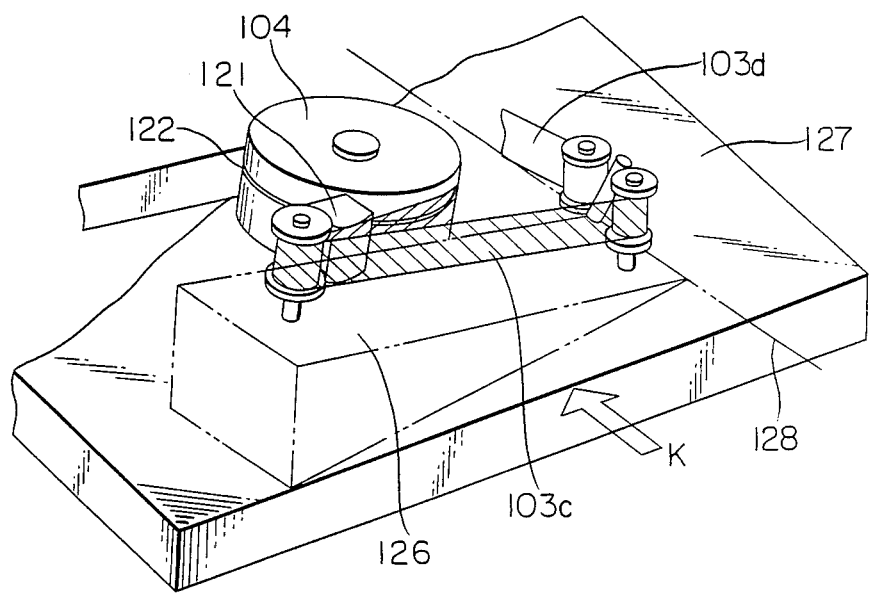
FIG. 6 is a perspective view of a loading tape path.

The description will be first commenced with the concept of the cross line which provides the basis for the tape running, with reference to FIGS. 4 to 6.

FIG. 4 shows an arrangement which is generally referred to as "U-loading". The tape portion between the take-up reel 106 to the guide drum 104 past the capstan 105 and the post A 120 is not oscillated with respect to the tape within the tape cassette 101. Thus, the tape path in this embodiment is characterized in that the guide drum 104 is inclined in the same direction as the tape between the guide drum 104 and the post A 120, i.e, in the direction P as shown in FIG. 4. The tape leads from the guide drum 104 to an inclined guide post 125 past the erase head 121, post B 122 and the post C 123, and, after untwisted by the inclined guide post 125, leads to the supply reel 102 past the vertical post D 124.

The tape portion between the guide drum 104 and the post C 123 is inclined in a certain direction, as well shown in FIG. 6. The post B 122 and the post C 123 are rotary posts which are perpendicular to the tape 103c. An imaginary plane normal to these posts is supposed under these posts. This imaginary plane is denoted by A 126 in FIG. 6. This plane A 126 extends in parallel with the longitudinal direction of the tape 103c, and is normal to the tape surface 103c. That is, the posts B 122 and the post C 123 are perpendicular to the plane A 126, so that the tape 103c runs in parallel with this plane. When this plane A 126 is used as a reference plane, the tape 103c can be regarded as being "non-twisted tape". FIG. 5 is a view in the direction of an arrow K. The relationship between the plane A 126, tape 103c and the post B 122 will be best seen from this Figure. Assuming here that this plane A 126 is spaced by a predetermined distance from the tape center of the tape 103c, the reference tape 103d, which is not twisted with respect to the tape 103 in the cassette, also defines a reference plane 127 which is at a distance S1 from the tape center. These two planes intersect each other at a point 128. Since both are planes, the point 128 of intersection constitute a straight line. This line is usually referred to as "cross line", and contains the point D of intersection between the tape 103c and the tape 103d. That is, the cross line is the line at which the level of the twisted tape 103c becomes the same as that of the tape 103d. The inclined guide post can untwist the twisted tape but in almost ineffective in the elimination of the difference in the level of the tape. It will be clear that the inclined guide post can be disposed only in the area near the cross line at which the level difference of the twisted tape 103c is absorbed. The twisting of the tape can be eliminated provided that suitable inclination angle, inclination direction and the tape winding angle are imparted to the inclined guide post 125.

The tape running system will be explained with reference to FIGS. 1, 2 and 64.

As has been described with reference to FIG. 1, the guide drum 60 is moved from the position C2 to the position C3 with respect to the tape cassette, so that, when the tape cassette is mounted, the guide drum 60 is in the position C1 where it opposes the supply reel 31 and the take-up reel 32 across the tape 4' stretched on the front side of the tape cassette. In this embodiment, the kind of the tape cassette is detected in this state and, if the tape cassette is the standard tape cassette 1, the guide drum 60 moves to the position C2. Meanwhile, the tape loading operation is conducted by a plurality of posts so as to wind the tape on the guide drum 60 over a predetermined angle. In the case where the tape cassette is the short play S cassette 30, the guide drum 60 moves to the position C3 beyond the position C2. Meanwhile, the post received in the tape cassette opening 7 extracts the tape 4' from the tape cassette and winds the same on the guide drum 60 over an angle of 331.5°.

Figure 64:
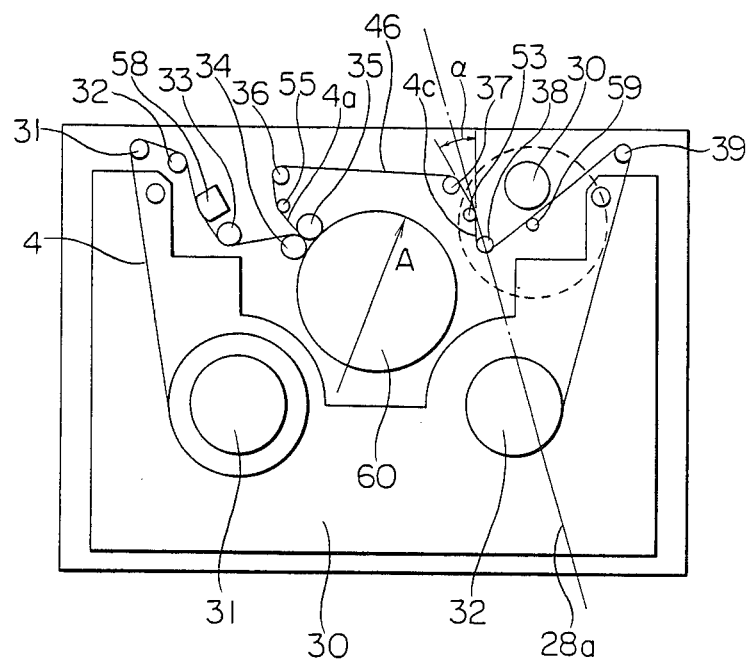
FIGS. 64 and 65 are illustrations of the tape paths as obtained when the short playing tape path is used.
Figure 65:
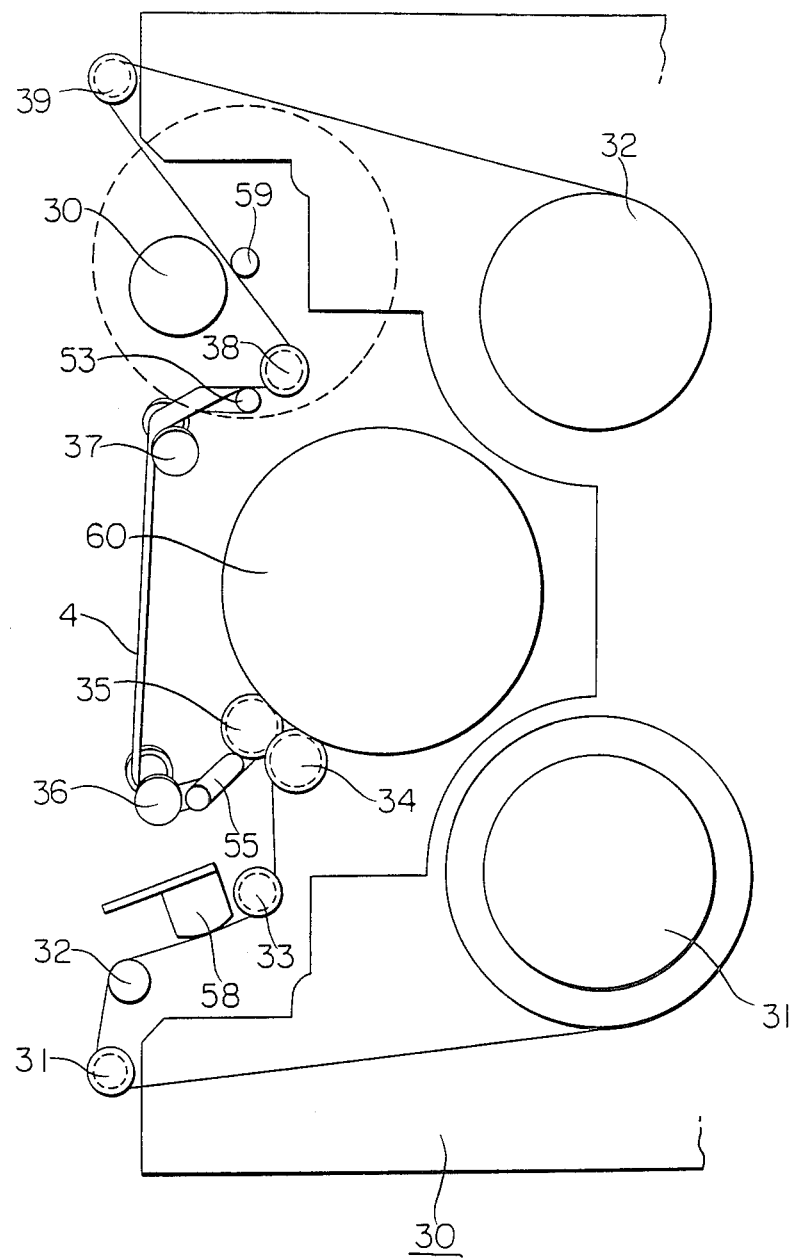

FIG. 64 shows an example of the tape loading device employing an S cassette 30. The tape 4 delivered by the supply reel 31 leads to the guide drum 60 past the rotary posts such as the S1 post 31, S2 post 33, S3 post 34, tension post 32 and the erase head 58. The guide drum 60 is inclined in the direction A by an angle equal to the lead angle. This direction A is parallel to the tape stretched between the S3 post 34 and the guide drum 60, so that all the tape guide members between the supply reel 31 and the guide drum 60, including the erase head 58, are perpendicular to the bottom surface of the cassette. The tape which has run 331.5° on the guide drum leads to the inclined guide post 53 while being guided by the rotary posts such as the T1 post 35, T2 post 36 and the T3 post 37 and then by the stationary post 55. The stationary post 55 holds the tape in a helical form, unlike other posts, so that the condition of twisting is changed across this stationary post 55. That is, the state of twisting of the tape 4a stretched between the guide drum 60 and the stationary post 55 past the T1 post 35 is different from the state of twisting of the tape 4b extending between the stationary post 55 and the inclined post 53 past the T2 post 36 and the T3 post 37. A reference numeral 53 designates an inclined guide post which is intended for untwisting the twisted tape. Thus, the tape 4c coming from the inclined guide post 53 has been untwisted so that it runs in the same plane as the tape within the cassette. The tape guiding parts downstream from the inclined guide post 53, i.e., the T4 post 38, T5 post 39, capstan 59 and the pinch roller 30 are arranged perpendicularly to the bottom surface of the cassette, as in the case of the tape guide members adjacent to the supply reel 31. A reference numeral 28a designates the cross line 28a mentioned before, at which the level difference between the tape 4b and the tape 4c is extinguished. The cross line 28 depends on the position of the guide drum 60. Since the position of the cross line 28 depends on the position of the guide drum 60, the positional relationship between the cross line 28a and the guide drum 60 is the same as that between the cross line 28b and the guide drum 60 shown in FIG. 2 which shows the case where the standard cassette 1 is used. FIG. 2 illustrates the tape path which is obtained when the standard tape cassette 1 is mounted on the device shown in FIG. 64. In the state shown in FIG. 2, the positions of the guide drum 60, S3 post 34, T1 post 35, T3 post 37, stationary post 55 and the inclined guide post 53 have been changed from those shown in FIG. 64. More specifically, as shown in FIG. 61, these tape guide members have been displaced by a distance L from the position normal to the tape 4' stretched on the front side of the cassette. The tape from the inclined guide post 53, i.e., the tape stretched between the inclined guide post 53 and the T4 post 38, also extends in the direction perpendicular to the tape 4' stretched on the front side of the cassette. As will be understood from the foregoing description, since the direction of movement of the guide drum 60 is parallel to the direction in which the tape 4c is stretched, the angle $\alpha$ of winding of the tape on the inclined guide post 53 is not change even though the distance between the inclined guide post 53 and the T4 post 38 is changed as a result of a movement of the guide drum 60.

For the purpose of ensuring a stable running of the tape, it is necessary that the tape running system avoids any irregular or uneven application of tension to the magnetic tape, i.e., to provide a uniform distribution of tension along any cross-section of the tape in the breadthwise direction. To this end, it is necessary that the factors such as the position, tape winding angle $\alpha$, inclination angle to tape and the direction of inclination of the inclined guide post 53 meet the predetermined requirements. Amongst these factors, the position of the inclined guide post is the relative position of the same with respect to the guide drum. Since the inclined guide post 53 moves together with the guide drum 60, there is no change in this relative position. The inclination angle and the inclination direction also are unchanged because the inclined guide post 53 moves in the direction perpendicular to the tape 4'stretched on the front side of the cassette within a plane which is parallel to the bottom surface of the tape cassette.

However, the tape winding angle $\alpha$ of the tape on the inclined guide post 53 is undesirably changed failing to meet the condition for the stable running, when the tape 4c between the inclined guide post 53 and the T4 post 38 forms a specific angle to the direction of the movement. In this embodiment, therefore, the arrangement is such that the guide drum 60 moves in the direction parallel to the tape 4c so as to prevent any change in the tape winding angle $\alpha$, thereby obviating the above-described problem.

In this embodiment, the inclination angle of the guide drum 60 must be equal to the lead angle and the direction of inclination must be parallel to the tape entering direction, in order to permit the tape guide members 31 through 34 adjacent to the supply reel to be disposed perpendicularly to the bottom surface of the tape cassette. In consequence, the condition for twisting for the tape 4a is automatically determined. With such a tape 4a, the tape path as a whole occupies a very large area, so that the tape 4c cannot be arranged perpendicularly to the tape 4' stretched on the front side of the tape cassette. In this embodiment, therefore, a stationary post 55 inclined wity respect to the tape 4a is provided and the factors such as direction of inclination, angle of inclination, tape winding angle and the tape position are suitably selected to generate a new twisting angle on the tape 4b, thereby allowing the tape 4c to be extended perpendicularly to the tape 4' stretched on the front side of the tape cassette.

In this embodiment, the arrangement for guiding the tape 4c from the inclined guide post 53 in the direction perpendicular to the tape 4' stretched on the front side of the tape cassette is realized only in the tape take-up side of the device. This arrangement, however, may be adopted equally well in the tape supply side or both in the tape take-up and supply sides of the device.

Although in this embodiment the guide drum 60 is adapted to be moved in the direction perpendicular to the tape 4' stretched on the front side of the tape cassette, this moving direction is not exclusive and the object of the invention is attainable with any desired moving direction of the guide drum.

It is to be understood, however, the arrangement in the described embodiment in which the guide drum 60 is moved perpendicularly to the tape 4' minimizes the area occupied by the mechanism for moving the guide drum. Regardless of the type of the tape cassette, i.e., irrespective of whether the tape cassette is the standard tape cassette or the short playing cassette, the size of the space behind the tape cassette opening is greatest at the point on a line which passes the mid point between the supply reel 2 and the take-up reel 3 and normal to the tape 4' stretched on the front side of the tape cassette. Therefore, the most rational arrangement is obtained for accommodating the guide drum 60, if the guide drum is designed to move along the line mentioned above, irrespective of whether the standard cassette tape 1 or the S cassette 30 is used, and the size of the device as a whole can be minimized with this rational arrangement.

A description will be made hereinunder as to the operation of the tape loading device attained when the S cassette 30 is mounted.

The operation for mounting the cassette holder itself is materially identical to that in the case where the standard cassette 1 is used, so that detailed description is omitted in this connection. Referring to FIGS. 32 to 34, when the presence of the tape cassette 1 is detected, the actuator 213 is rotated counter-clockwise so that the sub-slide plate B 172 is moved as a unit with the sub-slide plate A 164, as explained already. In consequence, the guide drum 60 is moved from the position C1 to C2 and then stopped, thereby forming the tape path as shown in FIGS. 2 and 39. In the case of the short playing tape cassette or S cassette 30, recess 30a is formed in the reverse side of the cassette 30 as will be seen from FIG. 62. Therefore, when the cassette holder on which the S cassette 30 is mounted is depressed, the recess 30a comes to receive the actuator 213 shown in FIG. 33, so that the actuator does not move from the position shown by full line. This situation is equivalent to the case where the tape cassette 1 is not mounted in the cassette holder. Therefore, as explained before, only the sub-slide plate 164 is moved towards the guide drum 60, while the sub slide plate B 172 is fixed at the position shown in FIG. 32, thus attaining a positional relationship as shown in FIG. 25. In consequence, the amount of movement of the main slide plate 130 becomes equal to the amount of movement of the loading chassis 64, as shown in FIG. 21. In view of the fact that the state shown in FIG. 43 is attained when the tape cassette 1 does not exist, it will be readily seen that, when the S cassette 30 is used, a tape running system is attained as shown in FIG. 64. Namely, the cassette detection means detects not only the presence or absence of the cassette but also whether the existing tape cassette is a standard cassette 1 or the short playing or S cassette 30, and performs a selection of moving pattern of the guide drum such that, when the standard cassette 1 is used, the guide drum moves from the position C1 to the position C2, whereas, when the S cassette 30 is used or when no tape cassette is used, the guide drum moves from the position C1 to the position C3.

According to the invention, the tape loading device can operate equally both for the S cassette 30 and the standard cassette 1, and reduces the area occupied by the tape path such as to minimize the size of the device as a whole regardless of the type of the tape cassette used. The relative position between the guide drum 60 and the cassette reel shaft differs between the case where the standard cassette 1 is used and the case where the S cassette 30 is used. According to the invention, however, the tape winding angle on the inclined tape untwisting guide post 53, as well as the inclination angle of the guide post 53, is ensured for satisfying the condition for stable running of the tape.

Thus, the structural features and the advantages of the tape loading device of the invention are summarized as follows.

The twisting of the tape, which is to be nullified by the inclined guide post, is attributable to the fact that the tape is helically wound on the guide drum 60. Thus, the twisting of the tape depends on the position of the guide drum 60. That is, the position of the inclined guide post has to be changed insofar as the guide drum 60 is movable. On the other hand, the tape winding angle on the inclined guide post can never be changed because this tape winding angle is one of the important factors for nullifying the tape twisting. In view of this fact, according to the invention, the guide posts between the guide drum 60 and the inclined guide post are arranged so as to move as a unit with the guide drum 60 and the inclined guide post, whereas the posts including the capstan perpendicular to the chassis, downstream from the inclined guide post, are fixed to the tape cassette or the reel driving block, so that the number of posts which take part in the moving operation is minimized thereby reducing the area occupied by the tape path. The tape coming out the inclined guide post is the first tape portion with which the twist has been nullified. In view of this fact, according to the invention, the tape running system is arranged in such a manner that the tape coming out the inclined guide post runs in the same direction as that of the movement of the guide drum 60 and the inclined guide post, so that the angle of winding of the tape on the inclined guide post is maintained constant well meeting the condition for stable tape running, despite the fact that the inclined guide post is movable while the vertical post immediately downstream of the inclined guide post is fixed to the reel driving block.

Figure 66:
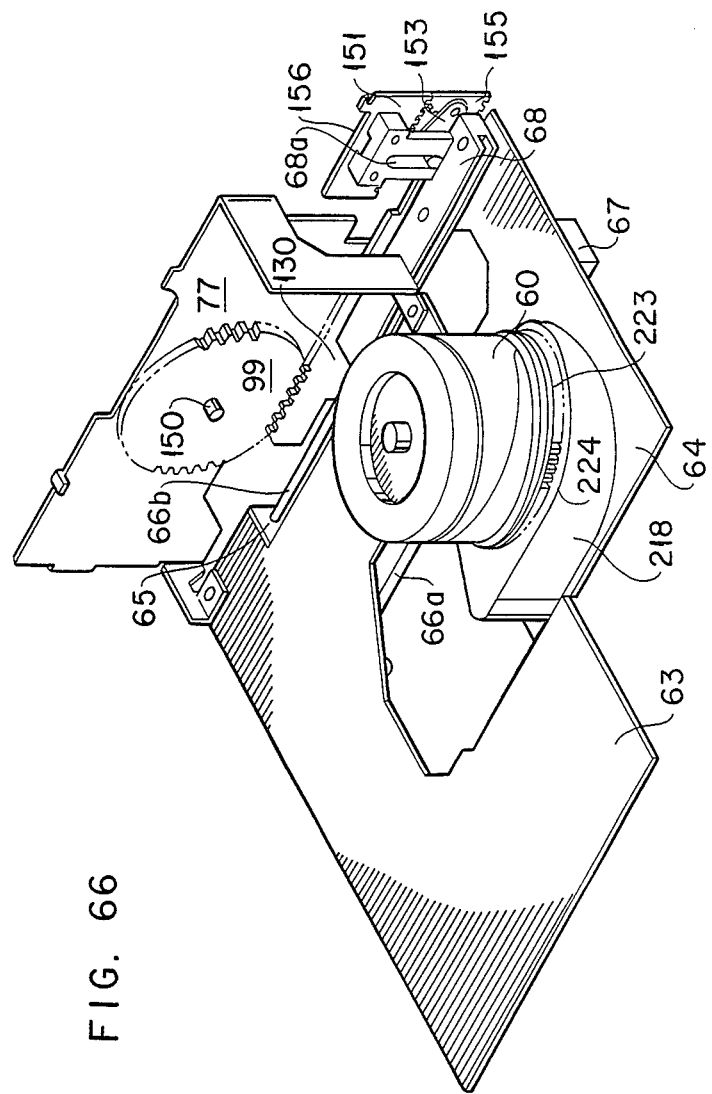
FIG. 66 is a perspective view illustrating the tape loading device with the guide drum set at position C1.

FIGS. 66 is a perspective view illustrating a tape loading device in which guide drum 60 is set at position C1. Reference numeral 63 denotes a driving chassis 63 incorporating thereon a supply reel base 61 and a take-up reel base 62 (see FIGS. 7 and 8), for supporting a standard cassette 1 or a small size casssette 30.

A left base plate 77 supporting rotatably a load gear 99 is secured to the left side of chassis 63, and load gear 99 is meshed with a rack 130a of a main slide plate 130 supported on a chassis guide 68. Further, a mode arm 153 is rotatably supported on main slide plate 130 and is urged counterclockwise by a mode spring 157 through the intermediary of a mode gear 155 and a mode change-over slide plate 151, having thereon a mode change-over pin 156 engaged in a guide hole 68a in a chassis guide 68 (see FIG. 16).

Meanwhile, chassis guide 68 (FIG. 20) is fastened by means of screws to a loading chassis 64 together with a chassis guide 67 slidably on guide shafts 66a, 66b in a shaft housing 65.

The above-mentioned arrangement is illustrated schematically in FIG. 68(a), that is, the clockwise torque F1 of load gear 99 supported on an unload gear shaft on 150 left base plate 77 is transmitted to main slide plate 130 as a slide force F2. Further, mode change-over pin 156 on mode arm 153 which is rotatably journalled to an arm shaft 154 on one end of main slide plate 130, exerts a slide force F3 in the same direction as that of force F2 effected through main slide plate 130, to chassis guide 68 through guide hole 68a. That is, torque F1 of loading gear 99 is turned into slide force F3 of loading chassis 64.

When a small size cassette 30 is loaded, clockwise torque F1 of load gear 99 is transmitted through the path as mentioned above, so that main slide plate 130, chassis guide 68 and loading chassis 64 are made, as one unit body, to approach drive chassis 63 by force F2 or F3. On this stage, the stroke of loading chassis 64 becomes LB as shown in FIG. 1 and in FIG. 68(b).

On the contrary, when a standard cassette is loaded, clockwise torque F1 of load gear 99 causes main slide plate 130 to move by stroke LB so that arm shaft 154 is moved to the same position as that shown in FIG. 68(c) while chassis guide 68 and loading chassis 64 linked to the former are moved by a stroke LA since mode arm 153 is rotated clockwise overcoming mode spring 157, due to the mechanism as explained elsewhere in this specification.

Figure 67:
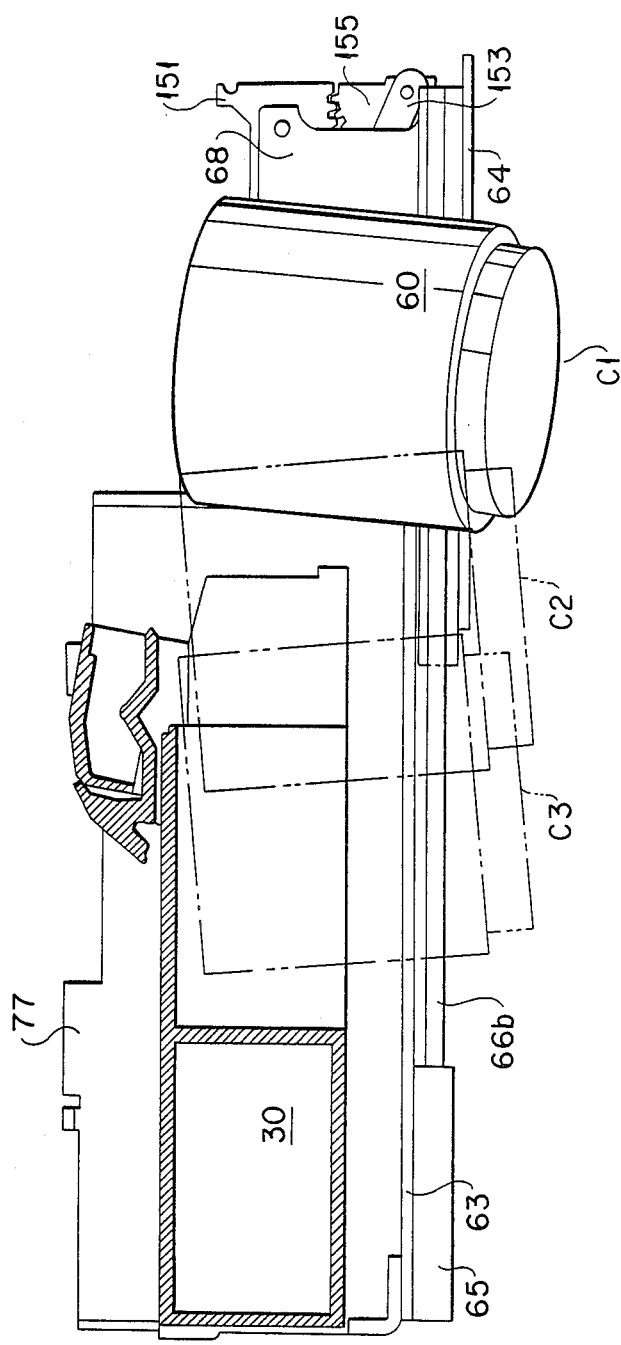
FIG. 67 is a side view showing details of the divice according to the invention.

Guide drum 60, which is supported on the above-mentioned chassis 64 and which is shown in the side view of FIG. 67, is rotated by a predetermined angle about an inclined center shaft (which is inclined in the direction Y in FIG. 37), and therefore, guide drum 60 is stored in a space in opening section 7, 39 of standard cassette 1 or small size cassette 30 when it is located at positions C2 and C3.

As will be understood from the foregoing description, the tape loading device in accordance with the invention offers the following advantages:

(1) The tape path affords the minimum possible size of the mechanism when a standard tape cassette is used.

(2) The capstan is fixed to the driving chassis regardless of the position of the guide drum, so that it is rather easy to make use of the capstan as the driving power source for driving the reel.

(3) When a short playing "S cassette" is used, the tape path affords attainment of a mechanism having an almost cassette size.

(4) Since the tape stretched between the inclined guide post and the T4 post extends in the direction parallel to the direction of movement of the guide drum, the tape path is not substantially affected by the precision of position of the guide drum when the latter is located at the position C1, C2 or C3, because the angle of winding of the tape on the inclined guide post is unchanged even with the low precision of the position of the guide drum. Consequently, a stable tape running is ensured.

(5) When the S tape cassette is used, the size of the VTR can be reduced almost to the same size as that obtained when no tape cassette is mounted, with a reduction in the mechanism size almost to the cassette size.

(6) In the foregoing description, the position C2 and C3 have been described as being the positions for the standard tape cassette and the S cassette. This, however, is not exclusive and the position of the guide drum in relation to the type of the tape cassette can be selected as desired. Thus, the tape loading device of the invention provides a tape path which well meets the condition for allowing the guide drum to be moved.

What is claimed is:

1. A tape loading device using a tape cassette in which a tape is accommodated and wound between a pair of reels, said device comprising:

a housing;

a guide drum disposed in said housing, for having said tape wound therearound, said guide drum being rotatable to run said tape;

tape guide posts disposed proximate said guide drum in said housing for guiding the running of said tape;

a pair of reel driving shafts disposed in said housing, for engaging with said reels of said tape cassette for driving said reels;

said housing including moving means for moving said guide drum and said tape guide posts among first, second and third positions, said first position being a position at which said guide drum and said tape guide posts are positioned outside an area where said tape cassette will be loaded, said second position being a position at which, after said tape cassette is loaded in said tape loading device, said tape is wound on said guide drum through said tape guide posts, and said third position being a position at which, after said tape cassette is unloaded, said guide drum and tape guide posts are positioned at said area where said tape cassette will be loaded;

said housing being adjustable in size responsive to said moving means moving said guide drum and said guide posts to have (i) maximum size when said guide drum and said tape guide posts are in said first position, (ii) intermediate size when said guide drum and said tape guide posts are in said second position, and (iii) minimum size when said guide drum and said tape guide are in said third position; and detecting means for detecting whether said tape cassette is loaded or not;

whereby, said guide drum and said tape guide posts are moved (i) to said first position in response to movement of said housing to said maximum size when said tape cassette is loaded, (ii) to said second position in response to movement of said housing to said intermediate size when said tape cassette loading is completed, and (iii) to said third position in response to movement of said housing to said minimum size after said tape cassette is unloaded.

* * * * *